United States Patent
Kwon et al.

(10) Patent No.: US 7,460,596 B2
(45) Date of Patent: Dec. 2, 2008

(54) ADAPTIVE DE-BLOCKING FILTERING APPARATUS AND METHOD FOR MPEG VIDEO DECODER

(75) Inventors: Do-Kyoung Kwon, Yongin (KR); Mei-Yin Shen, Kao-Hsiung (TW); Chung-Chieh Kuo, Taipei (TW)

(73) Assignee: Mediatek Incorporation, Science-Based Industrial Park, Hsin-Chu Hsien (TW)

( * ) Notice: Subject to any disclaimer, the term of this patent is extended or adjusted under 35 U.S.C. 154(b) by 946 days.

(21) Appl. No.: 10/709,336

(22) Filed: Apr. 29, 2004

(65) Prior Publication Data

US 2005/0243911 A1 Nov. 3, 2005

(51) Int. Cl.
*H04B 1/66* (2006.01)
(52) U.S. Cl. ................................. 375/240.03
(58) Field of Classification Search ............ 375/240.03, 375/240.25, 240.15, 240.26, 240.16, 240.27; 382/233; *H04B 1/66*
See application file for complete search history.

(56) References Cited

U.S. PATENT DOCUMENTS

| | | | |
|---|---|---|---|
| 5,590,064 A | 12/1996 | Astle | |
| 5,933,541 A | 8/1999 | Kutka et al. | |
| 5,937,101 A * | 8/1999 | Jeon et al. | 382/268 |
| 6,028,967 A | 2/2000 | Kim et al. | |
| 6,041,145 A * | 3/2000 | Hayashi et al. | 382/268 |
| 6,115,503 A | 9/2000 | Kaup | |
| 6,188,799 B1 | 2/2001 | Tan et al. | |
| 6,240,135 B1 | 5/2001 | Kim | |
| 6,298,161 B1 | 10/2001 | Koo et al. | |
| 6,317,522 B1 | 11/2001 | Rackett | |
| 6,320,905 B1 | 11/2001 | Konstantinides | |
| 6,360,024 B1 | 3/2002 | Tan et al. | |
| 6,370,279 B1 | 4/2002 | Paik | |

(Continued)

FOREIGN PATENT DOCUMENTS

WO WO 03/094521 A1 11/2003

OTHER PUBLICATIONS

R.Rosenholtz, A. Zakhor; Iterative procedures for reduction of blocking effects in transform image coding; IEEE Trans. Circuits Syst. Video Technolo; Mar. 1992; p. 91-p. 95; vol. 2.

(Continued)

*Primary Examiner*—Tung Vo
(74) *Attorney, Agent, or Firm*—Winston Hsu

(57) ABSTRACT

A post processing de-blocking filter includes a threshold determination unit for adaptively determining a plurality of threshold values according to at least differences in quantization parameters QPs of a plurality of adjacent blocks in a received video stream and to a user defined offset (UDO) allowing the threshold levels to be adjusted according to the UDO value; an interpolation unit for performing an interpolation operation to estimate pixel values in an interlaced field if the video stream comprises interlaced video; and a de-blocking filtering unit for determining a filtering range specifying a maximum number of pixels to filter around a block boundary between the adjacent blocks, determining a region mode according to local activity around the block boundary, selecting one of a plurality of at least three filters, and filtering a plurality of pixels around the block boundary according to the filtering range, the region mode, and the selected filter.

25 Claims, 29 Drawing Sheets

U.S. PATENT DOCUMENTS

| | | | |
|---|---|---|---|
| 6,459,731 B1 * | 10/2002 | Matthews et al. | 375/240.03 |
| 6,539,060 B1 | 3/2003 | Lee et al. | |
| 6,563,958 B1 | 5/2003 | Andrew | |
| 6,600,839 B2 | 7/2003 | Mancuso et al. | |
| 6,618,510 B1 | 9/2003 | Umiji | |
| 6,704,759 B2 | 3/2004 | Timko | |
| 6,950,473 B2 * | 9/2005 | Kim et al. | 375/240.29 |
| 6,983,079 B2 * | 1/2006 | Kim | 382/275 |
| 7,031,392 B2 * | 4/2006 | Kim et al. | 375/240.27 |
| 7,031,393 B2 * | 4/2006 | Kondo et al. | 375/240.29 |
| 7,227,901 B2 * | 6/2007 | Joch et al. | 375/240.29 |
| 2002/0051496 A1 | 5/2002 | Hashimoto | |
| 2002/0118399 A1 | 8/2002 | Estevez et al. | |
| 2002/0196856 A1 | 12/2002 | Miro Sorolla et al. | |
| 2003/0035586 A1 * | 2/2003 | Chou et al. | 382/233 |
| 2003/0044080 A1 * | 3/2003 | Frishman et al. | 382/268 |
| 2003/0053708 A1 | 3/2003 | Kryukov et al. | |
| 2003/0053711 A1 | 3/2003 | Kim | |
| 2003/0058944 A1 | 3/2003 | MacInnis et al. | |
| 2003/0152146 A1 | 8/2003 | Lin et al. | |
| 2003/0202608 A1 | 10/2003 | MacInnis et al. | |
| 2003/0219073 A1 | 11/2003 | Lee et al. | |
| 2003/0219074 A1 | 11/2003 | Park et al. | |
| 2005/0207492 A1 * | 9/2005 | Pao | 375/240.16 |
| 2005/0243913 A1 * | 11/2005 | Kwon et al. | 375/240.03 |
| 2005/0243916 A1 * | 11/2005 | Kwon et al. | 375/240.03 |
| 2005/0244063 A1 * | 11/2005 | Kwon et al. | 382/233 |

OTHER PUBLICATIONS

Y. Yang, N. P. Galatsanos, A.K.Katasggelos; Regularized reconstruction to reduce blocking artifact of block discrete cosine transform compressed image; IEEE Trans. Circuits Syst. Video Technol.;Dec. 1993; p. 421-p. 432; vol. 3.

Y. Yang, N. P. Galatsanos, A.K.Katasggelos; Projection-based spatially adaptive reconstruction of block-transform compressed images; IEEE Trans. Image Processing; Jul. 1995; p. 896-p. 908; vol. 4.

T.Meier, K.N.Ngan, G. Grebbin; Reduction of blocking artifacts in image and video coding; IEEE Trans. Circuits Syst. Video Technol; Apr. 1999; p. 490-p. 500; vol. 9.

T.P. O'Rourke, R.L. Stevenson; Improved image decompression for reduced transform coding artifacts; IEEE Trans. Circuits Syst. Video Technol.; Dec. 1995; pp. 490-pp. 499; vol. 5.

Y.L. Lee, H.C. Kim, H.W.Park; Blocking effect reduction of JPEG images by signal adaptive filtering; IEEE Trans. Image Processing; Feb. 1998; pp. 229-234; vol. 7.

H.W. Park, Y.L.Lee; A postprocessing method for reducing quantization effect in low bit-rate moving picture coding; IEEE Trans. Circuits Syst. VIdeo Technol; Feb. 1999; pp. 161-171; vol. 9.

S.D.Kim, J. Yi, H.M.Kim, J.B.RA; A deblocking filter with two separate modes in block-based video coding; IEEE Trans. Circuits Syst. VIdeo Technol; Feb. 1999; pp. 156-160; vol. 9.

P.List, A.Joch, J.Lainema, G.Bjontegaard, M.Karczewicz; Adaptive deblocking filter; IEEE Trans. Circuits Syst. VIdeo Technol; Jul. 2003; pp. 614-619; vol. 13.

* cited by examiner

Before filtering

After filtering $v_7$

After filtering $v_8$

ADAPTIVE DE-BLOCKING FILTERING APPARATUS AND METHOD FOR MPEG VIDEO DECODER

BACKGROUND OF INVENTION

1. Field of the Invention

The present invention generally relates to post-processing of block-based coded video, and more particularly to a filtering method and apparatus for removing blocking artifacts from MPEG-coded video.

2. Description of the Prior Art

A wide range of new applications in visual communications have been made possible due to the rapidly evolving telecommunication and computer industries. Almost all the related applications, including video conferencing, mobile or PSTN video telephony, video over the Internet, and digital TV broadcasting, require very efficient data compression methods to fit a large amount of visual information into the narrow bandwidth of communication channels while preserving acceptable quality of the reconstructed data.

To efficiently compress a time variable video sequence, redundancy in the temporal domain as well as in the two dimensional spatial domain must be reduced. The Moving Picture Experts Group (MPEG) standards use a discrete cosine transform (DCT) to reduce the redundancy in the two dimensional spatial domain and a motion compensation method to reduce the redundancy in the temporal domain.

The DCT is a method of reducing the correlativity between data through a two dimensional spatial transformation. Each block in a picture is spatially transformed using the DCT after the picture is divided into blocks. Data that has been spatially transformed tends to be driven to a certain direction. Only a group of the data driven in the certain direction is quantized and transmitted.

Pictures, which are consecutive in the temporal domain, form motions of a human being or an object at the center of the frame. This property is used to reduce the redundancy of the temporal domain in the motion compensation method. A volume of data to be transmitted can be minimized by taking out a similar region from the preceding picture to fill a corresponding region, which has not been changed (or has very little change), in the present picture. The operation of finding the most similar blocks between pictures is called a motion estimation. The displacement representing a degree of motion is called a motion vector. MPEG uses a motion compensation-DCT method so that the two methods combine.

When a compression technique is combined with a DCT algorithm, the DCT transform is usually performed after input data is sampled in a unit size of 8×8, and the transform coefficients are quantized with respect to a visual property using quantization values from a quantization table. Then, the data is compressed through a run length coding (RLC). The data processed with the DCT is converted from a spatial domain to a frequency domain and compressed through the quantization with respect to the visual property of human beings, not to be visually recognized. For example, since the human eye is insensitive to high frequencies, a high frequency coefficient is quantized using a large step size. Thus, a quantization table is made according to external parameters, such as a display characteristic, watching distance, and noise, to perform an appropriate quantization.

For the quantized data, the data having a relatively high frequency is coded with a short code word. The quantized data having a low frequency is coded with a long code word. Thus, the data is finally compressed.

FIG. 1 shows a plurality of adjacent 8×8 pixel blocks 100, 102, 104 used according to the above described MPEG compression. In processing a moving picture as discussed above, these blocks 100, 102, 104 are individually processed to maximize the compression ratio and coding efficiency. However, this individual processing causes blocking artifacts that are noticeable at boundaries between blocks. Both horizontal block boundaries 106 and vertical block boundaries 108 are present and tend to cause square patterns (blocking artifacts) that are quite apparent to the human eye.

At low coding bit rates, blocking artifacts are a serious problem for moving picture compression. Since a real-time operation is necessary in coding and decoding a moving picture, it is difficult to reduce the blocking artifact with a small operation capacity. As such, existing video compression algorithms and standards continue to have unwanted visual artifacts appear when the original information is compressed with loss, and these unwanted visual artifacts become more visible when the coding bit rates become lower.

In the traditional block-based video compression standards such as MPEG-1 and MPEG-2, the blocking artifact is the most noticeable artifact. In actuality, there are two main sources of blocking artifacts. As mentioned previously, the major source comes from individually encoding each 8×8 DCT block without considering the correlation between adjacent blocks. In this case, coarse quantization of the transform coefficients causes discontinuities at the block boundaries. The second source of blocking artifacts is from the motion compensated prediction. Motion compensation involves coding pixel data from a reference frame and results in a discontinuity at the edge of the copied block. Additionally, any blocking artifacts existing in the reference frame may also be propagated to a current frame due to copying process. As such, the blocking artifacts resulting from motion compensated prediction can occur at any position inside an 8×8 predictive block.

Accordingly, various methods for reducing blocking artifacts in coding systems that individually processes blocks have been developed. For example, de-blocking filters can be integrated into a video codec as either a loop filter or a post filter. Loop filters operate inside the motion compensation loop so that the filtered frames are used as reference frames of subsequent coded frames. However, this method of changing the processes of coding and decoding increases the amount of bits to be transmitted. Additionally, such an approach is unacceptable in many situations because the resulting data stream no longer complies with the applicable standards. Unlike loop filters, post filters operate on the decoded bit stream outside the coding loop. Thus, post filters can operate in conjunction with the original video compression standards. In other words, post filters can be easily integrated into any standard decoder using various implementation methods designed independent of the standard. A great amount of work has been done in the field of de-blocking filters, and the following papers are incorporated herein by reference:

[1] R. Rosenholtz and A. Zakhor, "Iterative procedures for reduction of blocking effects in transform image coding," IEEE Trans. Circuits Syst. Video Technol., vol. 2, pp. 91-95, March 1992.

[2] Y. Yang, N. P. Galatsanos, and A. K. Katsaggelos, "Regularized reconstruction to reduce blocking artifacts of block discrete cosine transform compressed image," IEEE Trans. Circuits Syst. Video Technol., vol. 3, pp. 421-432, December 1993.

[3] Y. Yang, N. P. Galatsanos, and A. K. Katasaggelos, "Projection-based spatially adaptive reconstruction of block-transform compressed images," IEEE Trans. Image Processing, vol. 4, pp. 896-908, July 1995.

[4] T. Meier, K. N. Ngan, and G. Grebbin, "Reduction of blocking artifacts in image and video coding," IEEE Trans. Circuits Syst. Video Technol., vol. 9, pp. 490-500, April 1999.

[5] T. P. O'Rourke and R. L. Stevenson, "Improved image decompression for reduced transform coding artifacts," IEEE Trans. Circuits Syst. Video Technol., vol. 5, pp. 490-499, December 1995.

[6] H. W. Park and Y. L. Lee, "A postprocessing method for reducing quantization effect in low bit-rate moving picture coding," IEEE Trans. Circuits Syst. Video Technol., vol. 9, pp. 161-171, February 1999

[7] S. D. Kim, J. Yi, H. M. Kim, and J. B. Ra, "A deblocking filter with two separate modes in block-based video coding", IEEE Trans. Circuits Syst. Video Technol., vol. 9, pp. 156-160, February 1999

[8] P. List, A. Joch, J. Lainema, G. Bjontegaard, and M. Karczewicz, "Adaptive deblocking filter," IEEE Trans. Circuits Syst. Video Technol., vol. 13, pp. 614-619, July 2003.

There are two approaches commonly adopted to reduce blocking artifacts: an iterative approach (references [1-5]) and a non-iterative approach (references [6-8]). Several iterative de-blocking methods have been used to alleviate blocking artifacts, including projection onto convex sets (POCS) (references [1-3]), Markov random field (MRF) (reference [4]), and maximum a posteriori (MAP) restoration (reference [5]). The main drawback of these iterative de-blocking methods is their high computational complexity, which prevents them from being used in a real-time video decoder.

Conversely, especially for real time applications, non-iterative de-blocking methods mostly using adaptive filters have also been adopted to reduce blocking artifacts. Park et al. (reference [6]) define a blocking semaphore to represent the strength of the blocking artifacts in the MPEG-4 decoder. The blocking semaphore is extracted from the DCT domain of each 8×8 block in the intra video object plane (VOP). The semaphores of the inter-VOP are calculated from both the residual signal and the semaphores of the reference VOP. Then, a one-dimensional strong low-pass filter and a special type of weak filter are adaptively applied on the horizontal and vertical block boundary to the blocking semaphores.

FIG. 2 shows a block diagram showing the mode decision procedure for a de-blocking filter having two separate filtering modes as proposed by Kim et al. (reference [7]). This de-blocking filter has also been included as an information section in the MPEG-4 video standard. The proposed filter performs one-dimensional filtering along the horizontal (and vertical) block boundaries 200 between 8×8 pixel blocks. In step 202, local image characteristics around the block boundary 200 are examined to determine if the block boundary 202 is a smooth region. In steps 204 and 206, an assessment is performed to determine if the block boundary represents a real edge that should be present in the image. If the block boundary is not a real edge, for the smooth region mode 212 to which flat regions belong, a strong nine-tap smoothing filter is applied to pixels inside the blocks as well as to the pixels at the block boundary. More specifically, the strong nine-tap filter is applied to pixels $v_1$ to $v_8$. For the default region mode 208, to which complex regions belong, a frequency analysis technique using 4-pt DCT kernel is used to filter pixels $v_4$ and $v_5$ at the block boundary only. If the block boundary 200 represents a real edge (steps 210 and 214), no filtering is applied. The de-blocking method proposed by Kim et al. results in high subjective quality of decoded images at low bit rates; however, it smoothes real edges and severely degrades the objective quality at higher bit rates due to the strong low-pass filter used in the smooth region mode. Moreover, this method does not consider block artifacts in inter-coded MBs that are caused by the motion compensated prediction.

List et al. (reference [8]) propose a sophisticated in-loop de-blocking filter for the H.264/MPEG-4 AVC video coding standard. The proposed in-loop de-blocking filter performs one-dimensional filtering along the block boundaries of a 4×4 block, which is the basic coding unit of the H.264 video codec. The 4×4 block boundaries are assigned boundary-strength (Bs) parameters from 0 to 4. Block boundaries having a B equal to 0 are not filtered, and a special type of weak filter is applied to block boundaries having Bs from 1 to 3. Finally, a stronger low-pass filter is applied to block boundaries having a B equal to 4. The in-loop de-blocking method proposed by List et al. improves both the subjective and objective quality, especially at low bit rates. However, due to its highly adaptive nature, this method also has a very high computational complexity. The filter can account for one-third of the computational complexity of an H.264/MPEG-4 AVC decoder even after a tremendous effort has been made in speed optimization of the filtering algorithms.

Accordingly, due to the above limitations, most of the prior art is only suitable for de-blocking filtering at low bit rates and is unable to provide satisfactory results at higher bit rates. However, the demand for de-blocking filtering of MPEG-encoded video at medium to high bit rates is increasing due to the wide acceptance of MPEG applications, such as digital versatile discs (DVDs) and digital TV.

SUMMARY OF INVENTION

One objective of the claimed invention is therefore to provide a highly adaptive de-blocking filter for an MPEG video decoder that can be used for both frame-coded and field-coded pictures at a wide range of bit rates with low computational complexity, to solve the above-mentioned problems.

According to the claimed invention, a method is disclosed for reducing a blocking artifact in a video stream, the method comprising: determining a filtering range according to block coding types of a plurality of adjacent blocks in the video stream, wherein the filtering range specifies a number of pixels to filter around a block boundary between the adjacent blocks; and filtering a plurality of pixels around the block boundary according to the filtering range to reduce the blocking artifact in the video stream.

Also according to the claimed invention, a method is disclosed for reducing a blocking artifact in a video stream, the method comprising: calculating an activity value representing local activity around a block boundary between a plurality of adjacent blocks in the video stream; determining a region mode for the block boundary according to the activity value; and selecting one of a plurality of at least three filters to filter a plurality of pixels around the block boundary to reduce the blocking artifact according to the region mode.

Also according to the claimed invention, a method is disclosed for reducing a blocking artifact in a video stream, the method comprising: calculating an activity value representing local activity around a block boundary between a plurality of adjacent blocks in the video stream; determining a region mode for the block boundary according to the activity value; and filtering a plurality of pixels around the block boundary according to the region mode and the quantization parameters (QPs) of the adjacent blocks, wherein the filtered pixels are further refined according to the quantization parameters (QPs) of the adjacent blocks, or wherein symmetric filters or asymmetric filters are used to filter the pixels according to the quantization parameters (QPs) of the adjacent blocks.

Also according to the claimed invention, a method is disclosed for reducing a blocking artifact in a video stream, the method comprising: calculating an activity value representing the local activity around a block boundary between a plurality of adjacent blocks in the video stream; determining a region mode for the block boundary according to the activity value; adaptively determining a plurality of thresholds according to at least differences in the values of quantization parameters (QPs) of the adjacent blocks; and filtering a plurality of pixels around the block boundary to reduce the blocking artifact according to the region mode and the plurality of thresholds.

Also according to the claimed invention, a method is disclosed for reducing a blocking artifact in a video stream, the method comprising: determining a region mode for a block boundary between a plurality of adjacent blocks in the video stream; and filtering a plurality of pixels around the block boundary to reduce the blocking artifact according to the region mode; wherein filtering the pixels around the block boundary comprises first filtering the pixels at the block boundary and next filtering pixels not adjacent to the pixels at the block boundary.

Also according to the claimed invention, a method is disclosed for reducing a blocking artifact in a video stream, the method comprising: calculating an activity value representing local activity around a block boundary between a plurality of adjacent blocks in the video stream; determining a region mode for the block boundary according to the activity value; and selecting one of a plurality of filters to filter a plurality of pixels around the block boundary to reduce the blocking artifact according to the region mode; wherein at least one of the filters is a one dimensional filter formed by using a 4-point Hadamard Transform (HT).

Also according to the claimed invention, a method is disclosed for reducing a blocking artifact in a video stream, the method comprising: calculating an activity value representing local activity around a block boundary between a plurality of adjacent blocks in the video stream; determining a region mode according to the activity value; determining a plurality of thresholds; the thresholds taking into account a user defined offset (UDO) allowing the thresholds to be adjusted according to the UDO value; and filtering a plurality of pixels around the block boundary according to the region mode and the thresholds.

Also according to the claimed invention, a post processing de-blocking filter is disclosed. The post processing de-blocking filter comprises: a threshold determination unit for adaptively determining a plurality of threshold values according to at least differences in quantization parameters QPs of a plurality of adjacent blocks in a received video stream and according to a user defined offset (UDO) allowing the threshold levels to be adjusted according to the UDO value; an interpolation unit for performing an interpolation operation to estimate pixel values in an interlaced field if the video stream comprises interlaced video; and a de-blocking filtering unit for determining a filtering range specifying a maximum number of pixels to filter around a block boundary between the adjacent blocks, for determining a region mode according to local activity around the block boundary, for selecting one of a plurality of at least three filters to filter pixels around the block boundary to reduce the blocking artifact, and for filtering a plurality of pixels around the block boundary according to the filtering range, the region mode, and the selected filter. Wherein the de-blocking filtering unit further refines the filtered pixels according to the quantization parameters QPs of the adjacent blocks, or uses symmetric filters or asymmetric filters to filter the pixels according to the quantization parameters QPs of the adjacent blocks; the de-blocking filtering unit first filters the pixels at the block boundary and next filters pixels not adjacent to the pixels at the block boundary; and at least one of the filters is a one dimensional filter formed by using a 4-point Hadamard Transform (HT).

These and other objectives of the claimed invention will no doubt become obvious to those of ordinary skill in the art after reading the following detailed description of the preferred embodiment that is illustrated in the various figures and drawings.

DETAILED DESCRIPTION

Figure 1:
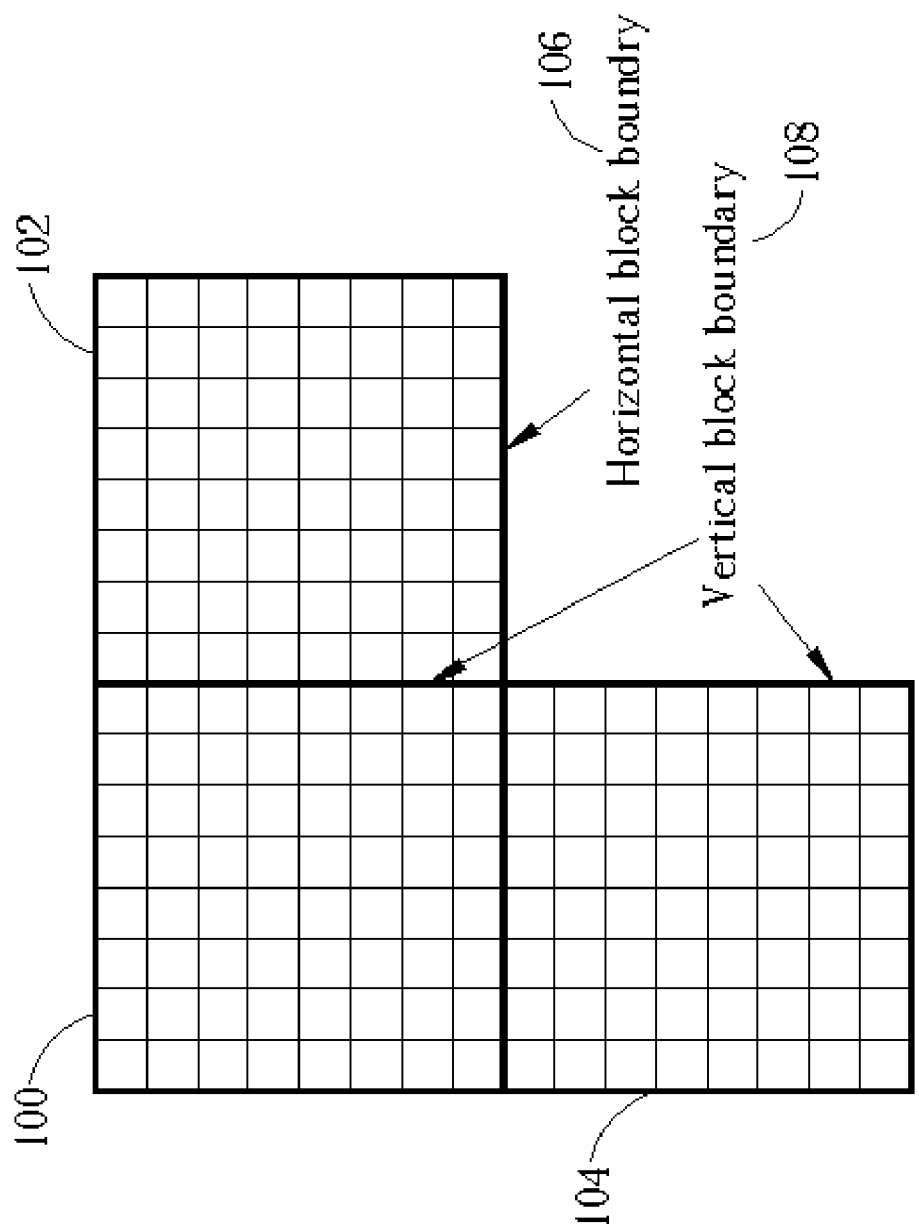
FIG. 1 shows a plurality of adjacent 8×8 pixel blocks according to the prior art.
Figure 2:
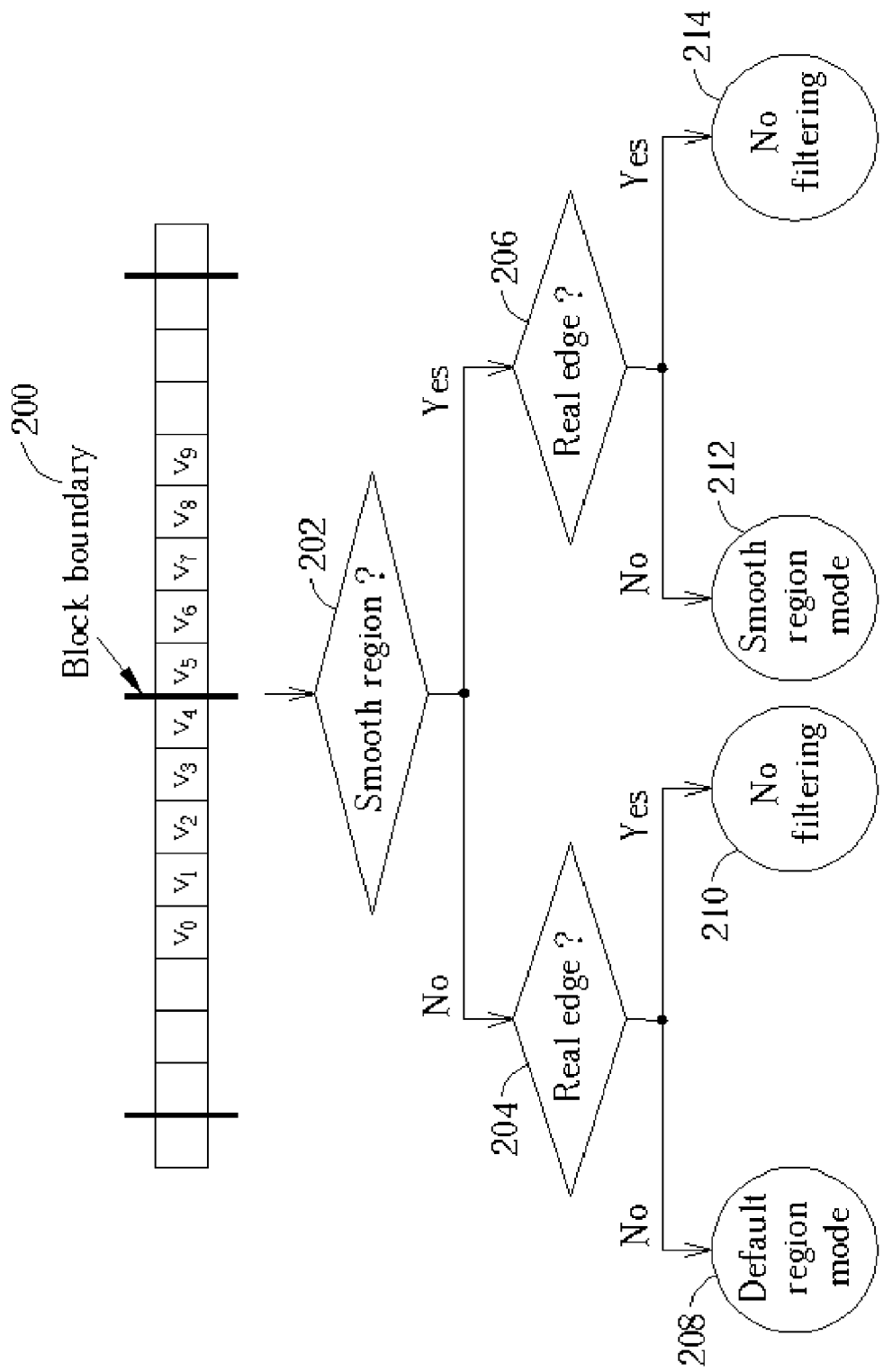
FIG. 2 shows a block diagram showing the mode decision procedure for a de-blocking filter having two separate filtering modes according to the prior art.
Figure 3:
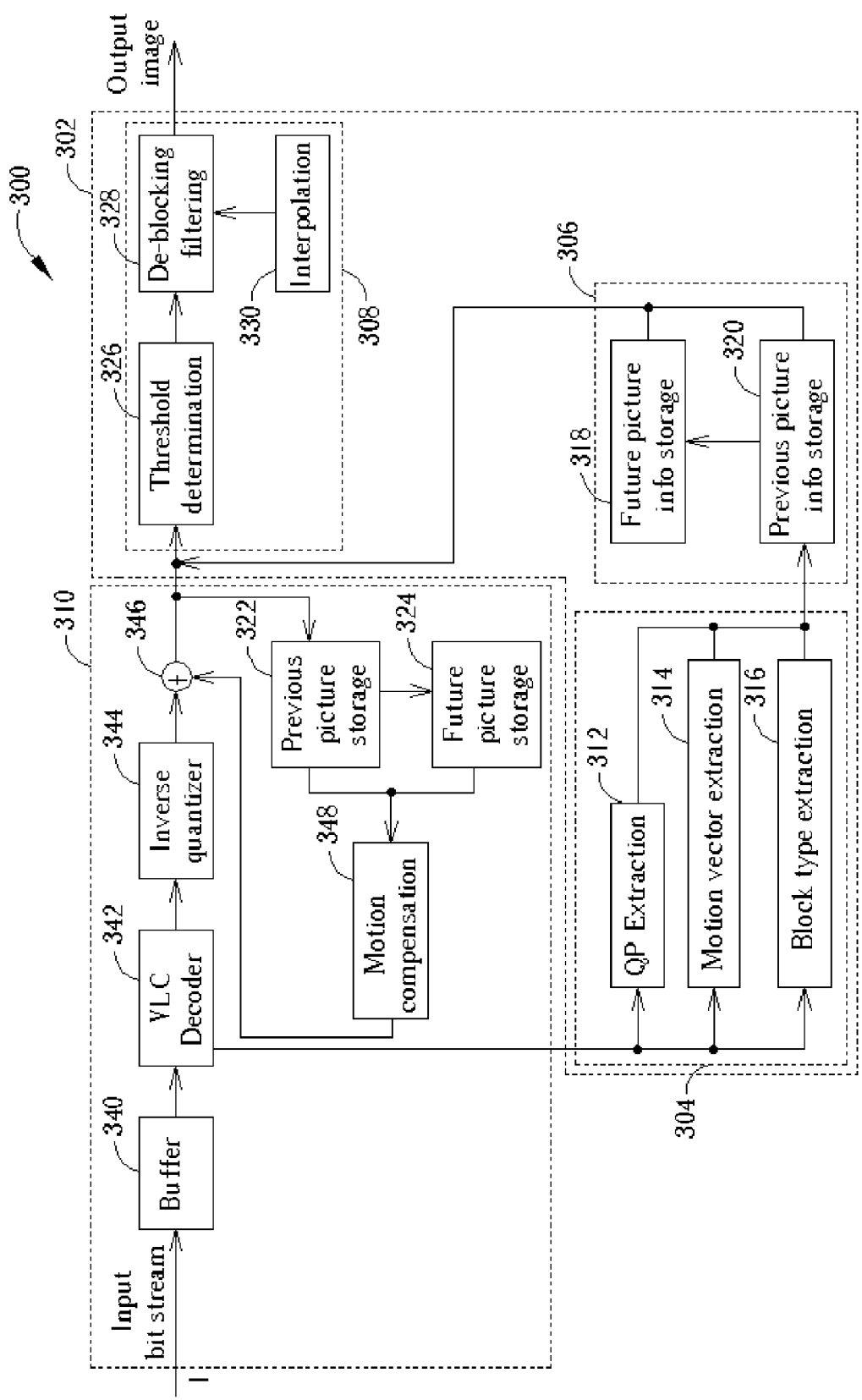
FIG. 3 is a block diagram showing a video decoder incorporating a post-processing de-blocking device according to the present invention.

FIG. 3 is a block diagram showing a video decoder 300 incorporating a post-processing de-blocking device 302 according to the present invention. As described previously, when the de-blocking filter is integrated into a video decoder 300 as a post-processing de-blocking device 302, the post-processing de-blocking device 302 operates on decoded frames after the decoding loop. In the block diagram shown in FIG. 1, the post-processing de-blocking device 302 comprises three units: a picture-information extraction and buffering unit 304, a picture-information reordering unit 306, and a post-processing unit 308. The post-processing unit 308 is cascaded with a standard MPEG decoder 310 without changing the bit stream syntax of an input bit stream I. The standard MPEG decoder 310 receives the input bit stream I and includes a buffer 340, a variable length code (VLC) decoder 342, an inverse quantizer 344, a summing unit 346, a motion compensation unit 348, previous picture storage 322, and future picture storage 324. As the operation of the standard MPEG decoder 310 is well-known to a person skilled in the art of MPEG decoding, further description of its operation is omitted.

The picture-information extraction and buffering unit 304 further includes three subunits: a QP extraction unit 312, a motion vector extraction unit 314, and a block type extraction unit 316. The QP extraction unit 101 extracts the QP of each macroblock (MB) and stores it in a first picture-information buffer. The QP value of an intra-coded or inter-coded MB can be obtained from the bit stream directly. However, the QP value of a skipped MB is not available from the bit stream. For skipped MBs, the QP value is estimated from the QP values of collocated MBs in the reference frames. When the skipped MB is in a P-picture, the QP is estimated using the QP of a collocated MB in the forward reference frame. If the skipped MB is in a B-picture, the QP is estimated by averaging two QP values obtained from collocated MBs in the forward and backward reference frames. The motion vector extraction unit 314 extracts and stores in a second picture-information buffer the motion vector indicator (MVI) of each MB rather than the motion vector itself. The MVI is calculated using the following criterions: If one of the horizontal or vertical motions is larger than 2×mv pixels, then the MVI is set to a value of 2. When the motion is larger than mv, the MVI is set to a value of 1. Where, the value mv is a function of the picture size and is defined as follows: if the picture size is smaller than the CIF format, mv is set to a value of 1, otherwise, mv is set to a value of 2. A buffered MVI is used for determining thresholds used by the post-processing de-blocking device 302. The block type extraction unit 316 extracts and stores the 8×8 block coding type in a third picture-information buffer. The block coding type can be intra-coded, inter-coded, or skipped, and the block coding type can be obtained directly from the bit stream.

The picture-information reordering unit 306 includes previous picture-information storage 318 and future picture-information storage unit 320. The picture-information reordering unit 306 simply reorders the data stored in the above mentioned three picture-information buffers in the picture-information extraction and buffering unit 304. The reordering is performed in the same way as the picture reordering units (previous picture storage 322 and future picture storage 324) in the standard MPEG decoder 310. The reason why the buffering and reordering of picture-information is necessary is that de-blocking device 302 operates outside of the decoding loop. Thus necessary information, such as the data stored in the three picture-information buffers, must be preserved and transmitted to the post-processing unit 308.

The post-processing unit 308 includes three subunits: a threshold determination unit 326, an interpolation unit 330, and a de-blocking filtering unit 328. The threshold determination unit 326 determines the proper threshold values for a mode decision and a filtering decision using the information received from the picture-information extraction and buffering unit 304. The threshold values are determined and adapted for each filtering operation based on various types of coding information, including QP values, absolute differences of QP values, picture coding types, as well as block coding type. It should be noted that other types of coding information can also be used to determine the threshold values. The interpolation unit 330 is used only for field-coded pictures and estimates pixel values of opposite fields using a simple interpolation technique so that the same de-blocking filter can be applied to both frame-coded and field-coded pictures without requiring significant modification. The de-blocking filtering unit 328 performs adaptive filtering to remove blocking artifacts around each 8×8 block boundary. In the de-blocking filtering unit 328, the block boundary is first classified into one of two categories based on the block coding types and is then further classified into one of three region modes for each category. Therefore, there are total six modes to choose for de-blocking. Different one-dimensional filters are applied to the block boundary according to the mode. The implementation of the post-processing unit 302 is further described in the subsequent sections of the detailed description of the present invention.

Figure 4:
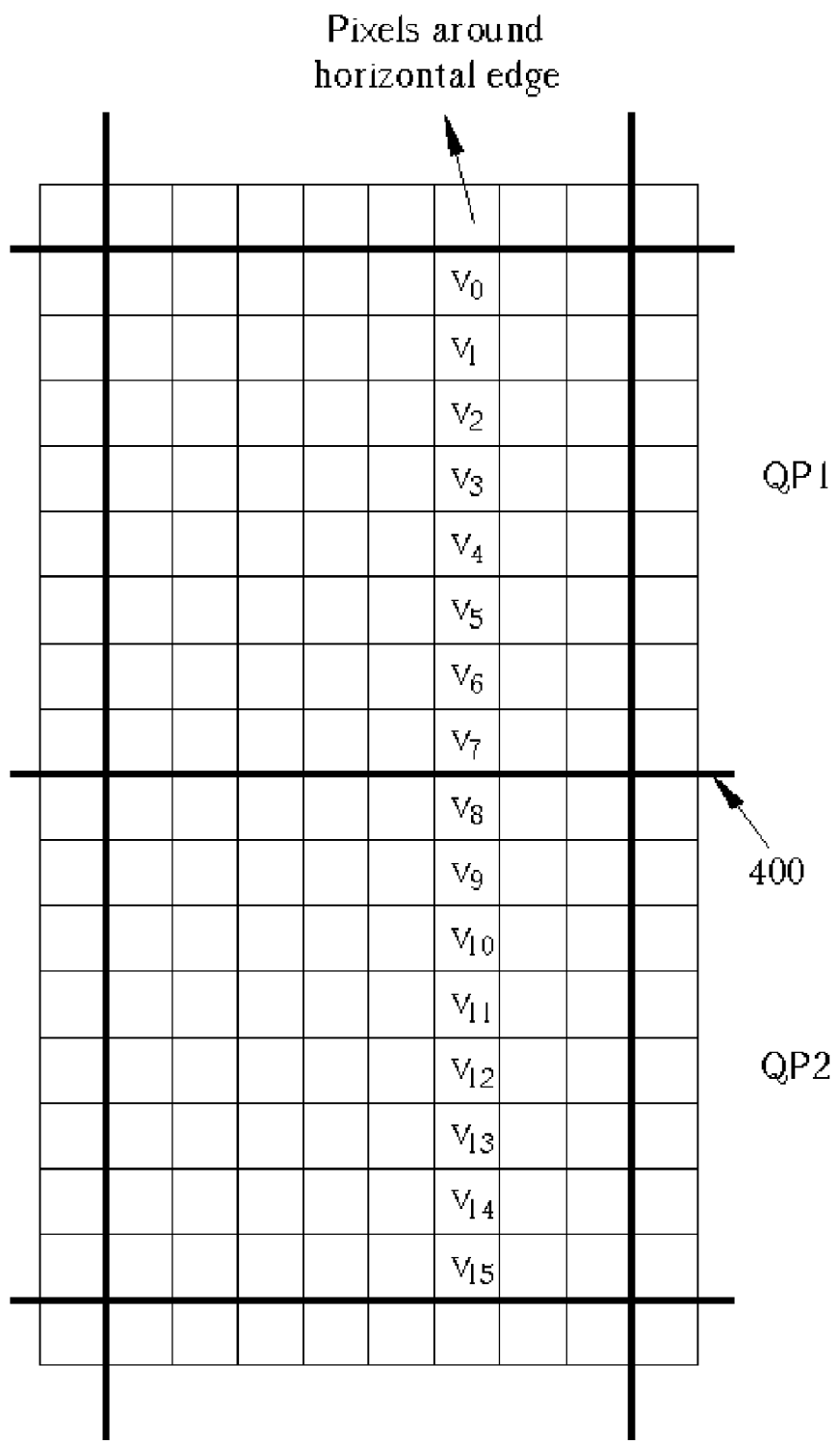
FIG. 4 illustrates a horizontal 8×8 block boundary and pixel indexes according to the present invention.
Figure 5:
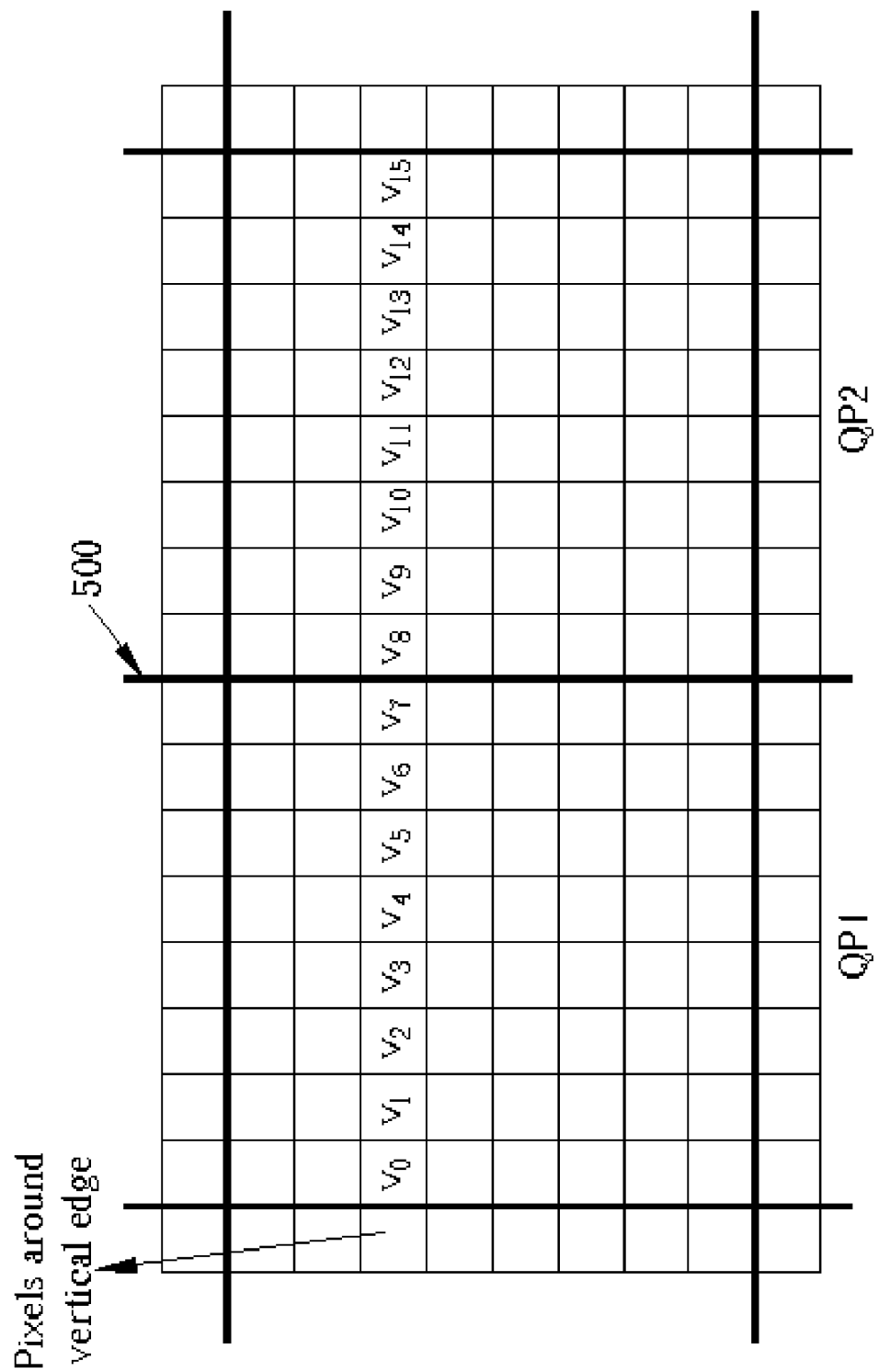
FIG. 5 illustrates a vertical 8×8 block boundary and the pixel indexes according to the present invention.

Please refer to FIG. 4 and FIG. 5. FIG. 4 illustrates a horizontal 8×8 block boundary 400 and pixel indexes ($v_0$ to $v_{15}$) used according to the present invention. FIG. 5 illustrates a vertical 8×8 block boundary 500 and the pixel indexes ($v_0$ to $v_{15}$) used according to the present invention. Horizontally or vertically adjacent 8×8 blocks can be encoded with different QPs (QP1 and QP2) if the two blocks belong to different MBs. In the present invention, whenever the decoded frame is filtered, one-dimensional horizontal filtering is first applied and is then followed by one-dimensional vertical filtering. That is, a set of one-dimensional de-blocking filters is first applied to vertical boundaries and then to horizontal boundaries. Moreover, each filtered pixel value is used for subsequent filtering operations.

Figure 6:
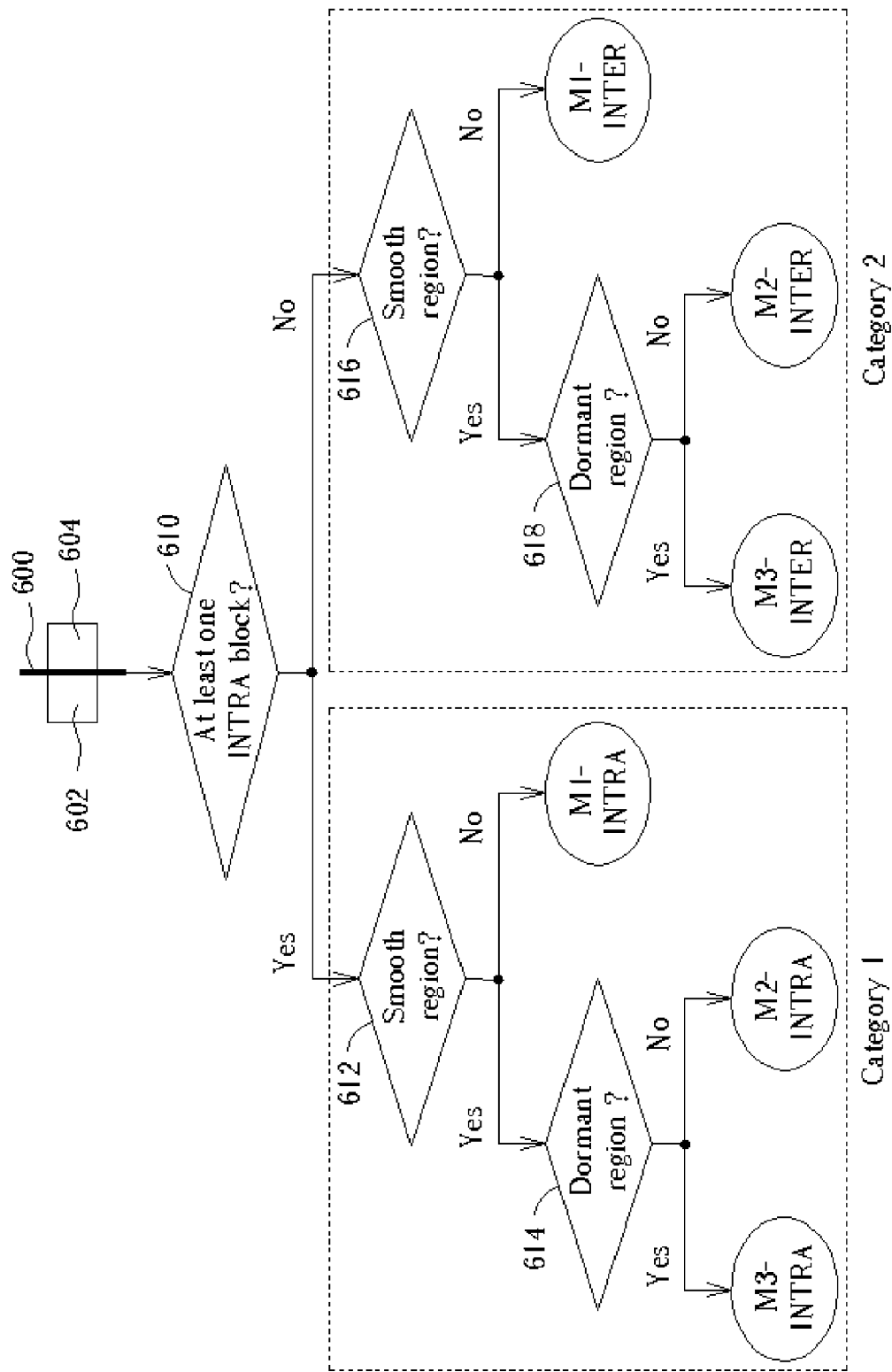
FIG. 6 is a flowchart describing the mode decision procedure for the post-processing device of FIG. 3.

FIG. 6 is a flowchart describing the mode decision procedure for the post-processing unit 308 of FIG. 3. As shown in FIG. 6, a block boundary 600 is classified into one of six modes before it is filtered. The block boundary 600 can be either a vertical block boundary 500 as shown in FIG. 5 or a horizontal block boundary 400 as shown in FIG. 4. In step 610, the block boundary 600 formed by a first 8×8 block 602 and an adjacent 8×8 block 604 is examined to determine if at least one of either the first block 602 or the second block 604 is an intra coded block. If at least one of the adjacent 8×8 blocks 602, 604 is intra coded, the block boundary 600 is determined to be in Category 1, otherwise, in Category 2. These categories determine a filtering range of the de-blocking filtering unit 328. For Category 1, at most four pixels around the block boundary 600 are examined and filtered, and for Category 2, at most eight pixels are examined and filtered. If one of the adjacent blocks 602, 604 is an intra coded block, in steps 612 and 614, an activity value corresponding to pixel values around the block boundary 600 is used to determine a region mode. Likewise, if neither of the adjacent blocks 602, 604 is an intra coded block, in steps 616 and 618, the activity value is used to determine the region mode. According to the present invention, for each category, there are three types of region modes: active region (M1-INTRA, M1-INTER), smooth region (M2-INTRA, M2-INTER), and dormant region (M3-INTRA, M3-INTER). Active region corresponds to significantly varying pixel values around the block boundary 600, smooth region corresponds to moderately constant pixel values around the block boundary 600, and dormant region corresponds to extremely constant pixel values around the block boundary 600.

In order to determine the region mode, the activity value is computed as a sum of absolute differences between pixel values around the block boundary 600 as follows:

$$\text{ACTIVITY} = \sum_{l=4}^{6} |v_l - v_{l+1}| + \sum_{l=8}^{10} |v_l - v_{l+1}| \quad (1)$$

Using separate thresholds for each category, a block boundary 600 is considered to be in the active region if ACTIVITY is larger than a first threshold value, in the smooth region if ACTIVITY is larger than a second threshold value but smaller than or equal to the first threshold value, and in the dormant region if ACTIVITY is smaller than or equal to the second threshold. In a flat region having generally constant pixel values, even a small change in a pixel value can cause an annoying blocking artifact visible to the human eye. For this reason, the prior art applies a strong low-pass filter to flat regions. However, while the strong low-pass filter improves subjective quality at low bit rates, it also reduces the sharpness of the picture and degrades the objective quality at higher bit rates. However, if only a weak low-pass filter is applied to flat regions, even though the objective quality can be improved at high bit rates, the subjective quality may not be satisfied at lower bit rates. Thus, the present invention further divides these flat regions into two categories (smooth and dormant) and applies different filters to each of them. By controlling the amount of strong and weak low-pass filtering, the present invention is able to achieve a trade-off between subjective and objective quality.

For active regions (M1-INTRA, M1-INTER), pixels around the block boundary 600 are filtered using a special filter F-1. For smooth regions (M2-INTRA, M2-INTER), a set of weak low-pass filters F-2 is applied to the block boundary 600. If the region is extremely flat, i.e. for dormant regions (M3-INTRA, M3-INTER), a set of strong low-pass filters F-3 is applied to the block boundary 600. Further description of the three filters F-1, F-2, and F-3 is as follows.

The special filter F-1 is formed using a 4-pt orthogonal Hadamard transform (HT) kernel. This frequency analysis technique is used instead of low-pass filtering because low-pass filtering would smooth out any real edges in active regions. Suppose that two pixels, $v_7$ and $v_8$ are filtered using F-1. In order to filter these two pixels, the four pixels $v_6$, $v_7$, $v_8$ and $v_9$ are analyzed using the orthogonal HT kernel. Let $c_0$, $c_1$, $c_2$ and $c_3$ be the coefficients of the HT. Then, the HT and the inverse HT are as follows:

$$\begin{bmatrix} c_0 \\ c_1 \\ c_2 \\ c_3 \end{bmatrix} = \frac{1}{2} \begin{bmatrix} 1 & 1 & 1 & 1 \\ 1 & 1 & -1 & -1 \\ 1 & -1 & -1 & 1 \\ 1 & -1 & 1 & -1 \end{bmatrix} \begin{bmatrix} v_6 \\ v_7 \\ v_8 \\ v_9 \end{bmatrix},$$

$$\begin{bmatrix} v_6 \\ v_7 \\ v_8 \\ v_9 \end{bmatrix} = \frac{1}{2} \begin{bmatrix} 1 & 1 & 1 & 1 \\ 1 & 1 & -1 & -1 \\ 1 & -1 & -1 & 1 \\ 1 & -1 & 1 & -1 \end{bmatrix} \begin{bmatrix} c_0 \\ c_1 \\ c_2 \\ c_3 \end{bmatrix}$$

In the present invention, the high frequency component $c_3$ is reduced to 0 before the inverse HT is performed to remove the blocking artifact and only $v_7$ and $v_8$ are changed (filtered) to $v_7''$ and $v_8''$, as follows:

$$v_7' = \frac{1}{2}[1 \quad 1 \quad -1 \quad -1] \begin{bmatrix} c_0 \\ c_1 \\ c_2 \\ c_3' \end{bmatrix}, \quad v_8' = \frac{1}{2}[1 \quad -1 \quad -1 \quad 1] \begin{bmatrix} c_0 \\ c_1 \\ c_2 \\ c_3' \end{bmatrix}$$

where $c_3' = c_3 - \Delta = 0 \Rightarrow \Delta = c_3$

Thus, filtered results, $v_7''$ and $v_8''$ can be obtained without actually performing an inverse HT using the following formula:

$$v_7' = v_7 + \Delta 1, \quad v_8' = v_8 - \Delta 2 \quad \text{where} \quad \Delta 1 = \Delta 2 = \frac{\Delta}{2} \quad (2)$$

The present invention further refines these filtered values, using a weighted clipping technique. Let WT1 and WT2 be weighting factors, which are functions of QP values obtained from two adjacent blocks as shown in the following formula:

$$WT1 = QP1/QP1 + QP2, \quad WT2 = QP2/QP1 + QP2 \quad (3)$$

QP1 and QP2 are respective quantization parameters of MBs that having the boundary pixels $v_7$ and $v_8$. Using this clipping technique with the two weighting factors, Δ1 and Δ2 are further refined as shown in the following formula:

$v_7' = v_7 + \Delta 1$, $v_8' = v_8 - \Delta 2$ where $\Delta 1 = \text{clip}(\Delta \cdot WT1, 0, (v_8 - v_7) \cdot WT1)$, $\Delta 2 = \text{clip}(\Delta \cdot WT2, 0, (v_8 - v_7) \cdot WT2)$ and clip$(x, l, u)$ clips $x$ to a value between $l$ and $u$ (4)

Figure 7:
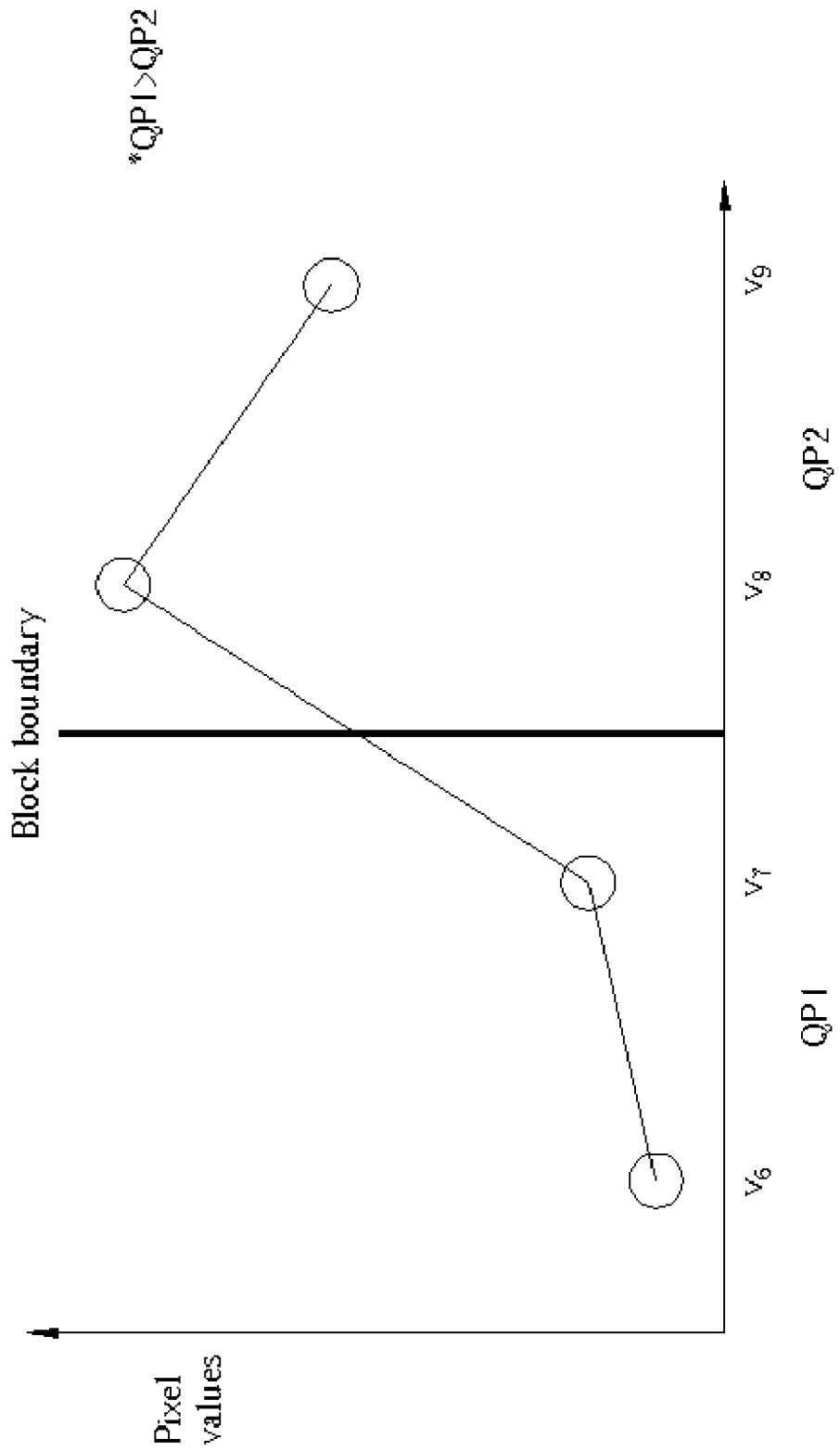
FIG. 7 is a one-dimensional view of a block boundary before filtering with the F-1 filter.
Figure 8:
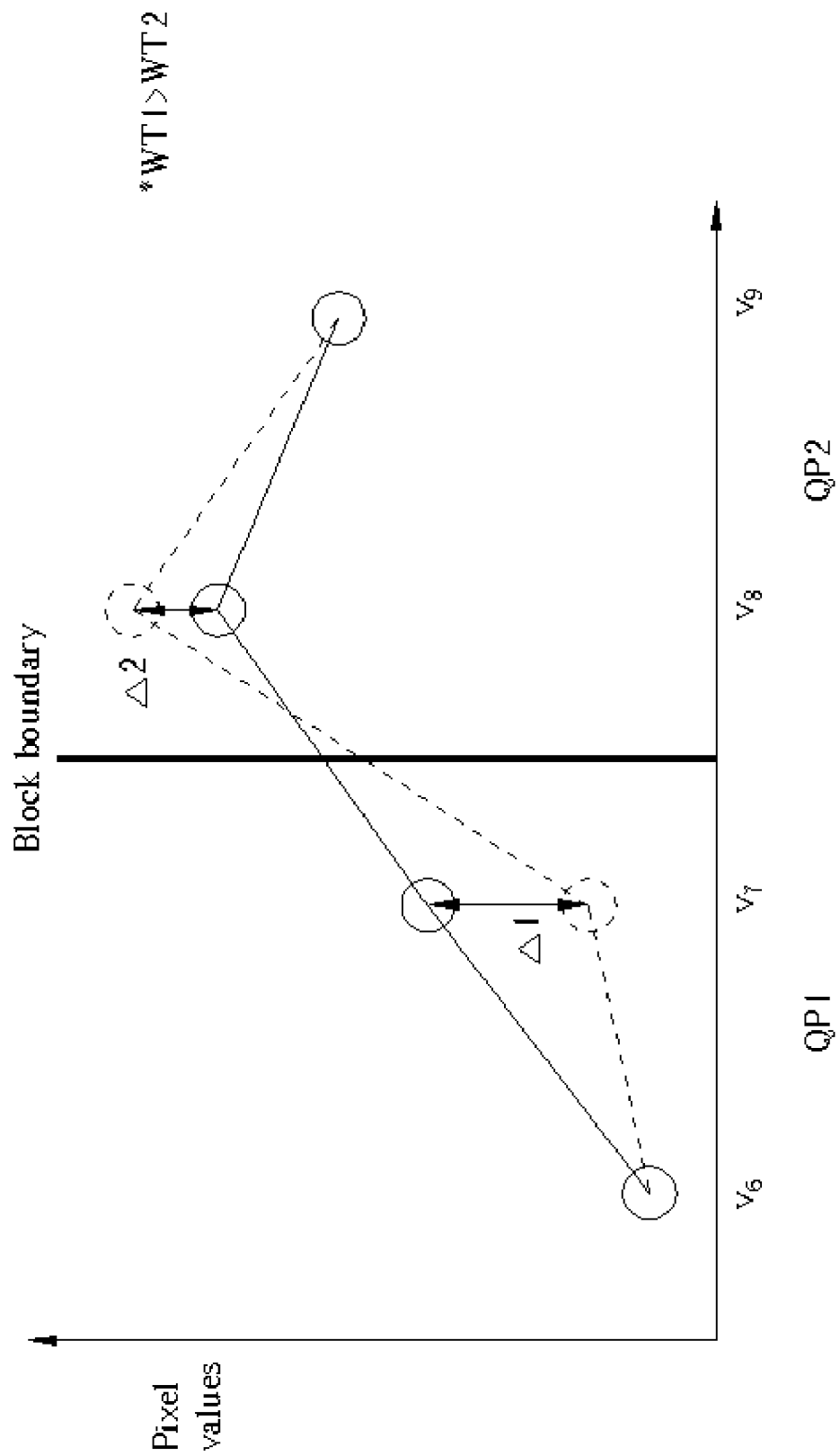
FIG. 8 is a one dimensional view of the block boundary of FIG. 7 after filtering with the F-1 filter.

Please refer to FIG. 7 and FIG. 8. FIG. 7 is a one-dimensional view of a block boundary before filtering with the F-1 filter. FIG. 8 is a one dimensional view of the block boundary of FIG. 7 after filtering with the F-1 filter. In FIG. 7 and FIG. 8, the block boundary is formed between two adjacent blocks having QP values of QP1 and QP2, respectively. In this example, QP1 is greater than QP2. A larger QP value means that the step sizes used to quantize the pixel values are larger, and therefore, that the error value associated with the larger QP pixel values is generally larger. As such, pixel values having smaller QP values can be considered more accurate. Using the above weighted clipping technique, a pixel quantized with a larger QP value will have more change in value after filtering than a pixel quantized with a smaller QP value. This can be seen if FIG. 8 where the change in value $\Delta$1 of the pixel v7 is larger than the change in value $\Delta$2 of the pixel v8. This is beneficial because the more accurate pixel values (being quantized with the lower QP value) are changed less by the F-1 filter and therefore a more accurate result is obtained.

The set of weak low-pass filters F-2 is applied to smooth regions (M2-INTRA, M2-INTRER). If QP1 is equal to QP2, the $v_7$ and $v_8$ pixels are filtered with the F-2 filter being defined as a symmetric 5-tap low-pass filter [1 3 8 3 1]/16 shown in the following formula:

$$v_7'=(v_5+3\cdot v_6+8\cdot v_7+3\cdot v_8+v_9)/16, v_8'=(v_6 3\cdot v_7+8\cdot v_6+3\cdot v_9+v_{10})/16 \quad (5)$$

However, if QP1 is not equal to QP2, the $v_7$ and $v_8$ pixels are filtered with the F-2 filter being defined as asymmetric 5-tab low-pass filters [1 2 8 3 2]/16 and [2 3 8 2 1]/16, respectively, as shown in the following formula:

$$v_7'=(v_5+2\cdot v_6+8\cdot v_7+3\cdot v_8+2\cdot v_9)/16, v_8'=(2\cdot v_6+3\cdot v_7+8\cdot v_8+2\cdot v_9+v_{10})/16 \quad (6)$$

Figure 9:
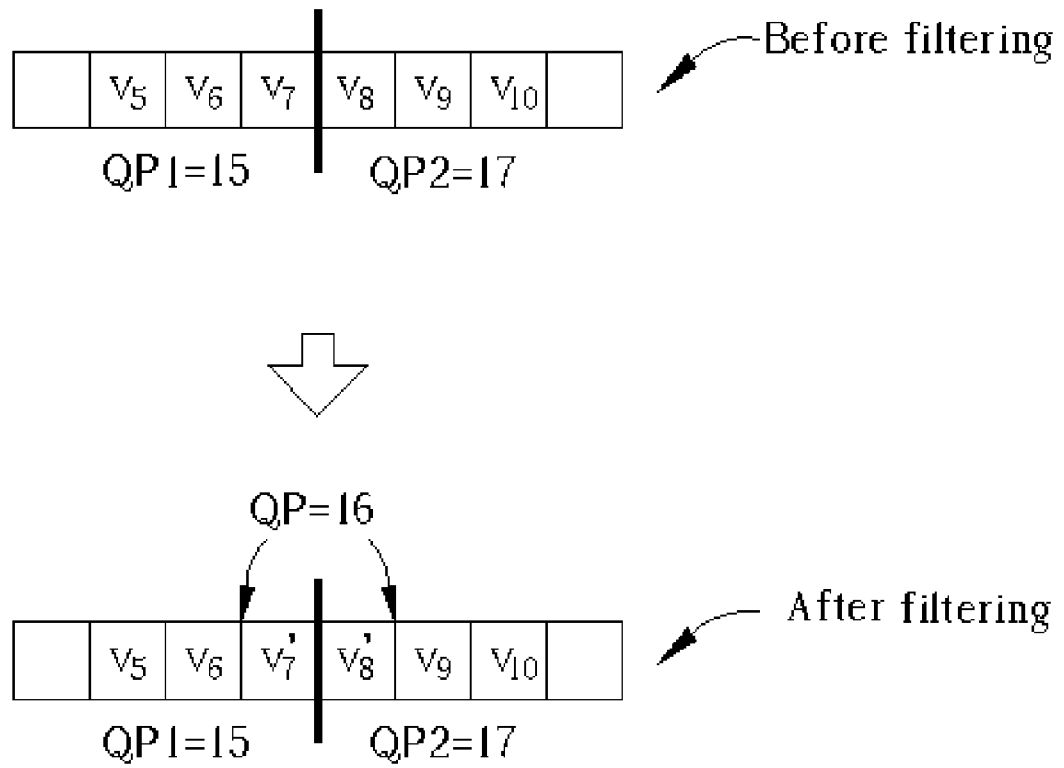
FIG. 9 shows how filtering $v_7$ and $v_8$ with asymmetric filters can achieve a result similar to the case when the two adjacent blocks are coded with the same QP value.

FIG. 9 shows filtering of $v_7$ and $v_8$ using asymmetric filters when the two adjacent blocks are coded with different QP values. The reason for using symmetric and asymmetric versions of the F-2 filter (and of the F-3 filter described later) is that blocking artifacts are generally more visible when the adjacent blocks forming the block boundary 600 are coded with different QP values. By applying different weightings during the filtering process, the effect of different QP values can be neutralized. For example, as shown in FIG. 9, suppose two adjacent blocks are coded with a first QP value QP1 equal to 15 and a second QP value QP2 equal to 17, respectively. Then, filtering $v_7$ and $v_8$ with asymmetric filters can achieve a result similar to the case when the two adjacent blocks are coded with the same QP value having a value equal to 16.

Figure 10:
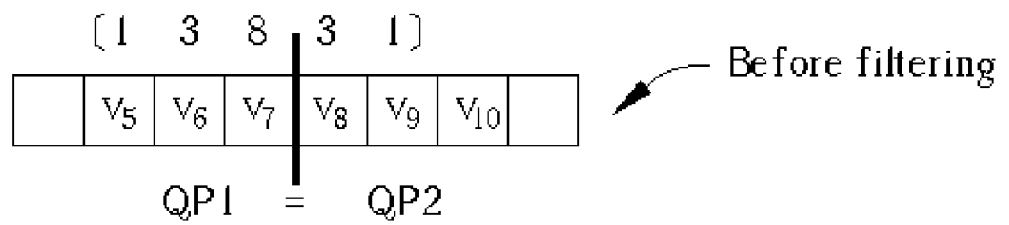
FIG. 10 illustrates using the symmetric F-2 filter to filter the pixels $v_7$ and $v_8$ belonging to first and second 8×8 blocks having equal QP values.
Figure 10:
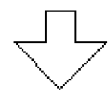
Figure 10:
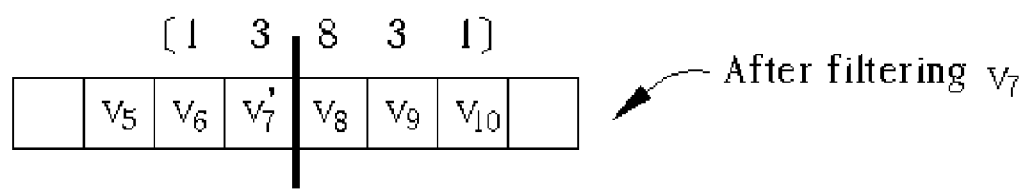
Figure 10:
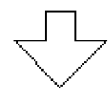
Figure 10:
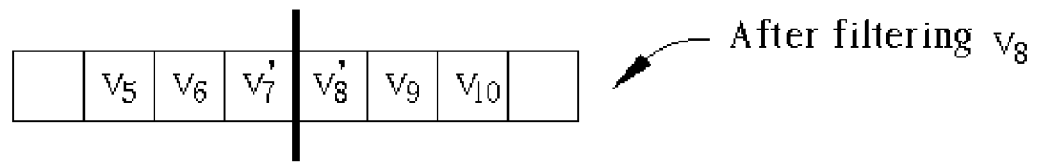
Figure 11:
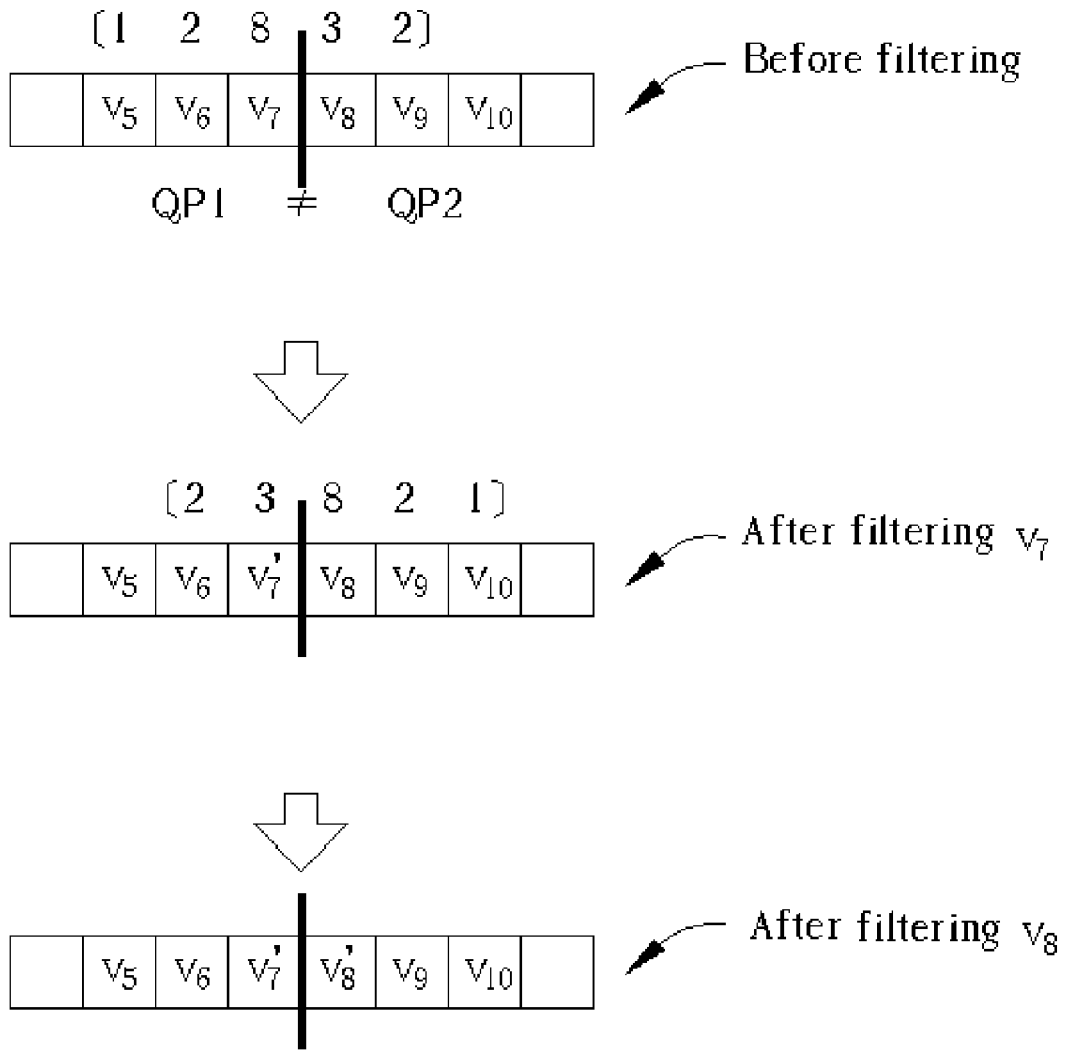
FIG. 11 illustrates using the asymmetric F-2 filter to filter the pixels $v_7$ and $v_8$ belonging to first and second 8×8 blocks having different QP values.

Please refer to FIG. 10 and FIG. 11. FIG. 10 illustrates using the symmetric F-2 filter being the 5-tap low-pass filter [1 3 8 3 1]/16 to filter the pixels $v_7$ and $v_8$ belonging to first and second 8×8 blocks having equal QP values. As shown in FIG. 10, the symmetric F-2 filter is first applied to $v_7$ and then applied to $v_8$ using the formulas (5) shown above. FIG. 11 illustrates using the asymmetric F-2 filter being the 5-tab low-pass filters: [1 2 8 3 2]/16 and [2 3 8 2 1]/16 to filter the pixels $v_7$ and $v_8$ belonging to first and second 8×8 blocks having different QP values. Similar to as shown in FIG. 10, the asymmetric F-2 filter shown in FIG. 11 is first applied to $v_7$ and then applied to $v_8$ using the formulas (6) shown above. It should be noted that when using the asymmetric filters, slightly more weighting is given to the adjacent 8×8 block when compared with the symmetric filters. Intuitively, this has an effect similar to adjusting the QP values of the two adjacent 8×8 blocks to be equivalent as shown in FIG. 9.

The set of strong low-pass filters F-3 is applied to dormant regions (M3-INTRA, M3-INTER). If QP1 is equal to QP2, the $v_7$ and $v_8$ pixels are filtered with the F-3 filter being defined as a symmetric 5-tap low-pass filter [1 2 2 2 1]/8 shown in the following formula:

$$v_7'=(v_5+2\cdot v_6+2\cdot v_7+2\cdot v_8+v_9)/8, v_8'=(v_6+2\cdot v_7+2\cdot v_8+2\cdot v_9+v_{10})/8 \quad (7)$$

However, if QP1 is not equal to QP2, the $v_7$ and $v_8$ pixels are filtered with a asymmetric F-3 filter being defined as 5-tab low-pass filters [1 1 2 2 2]/8 and [2 2 2 1 1]/8, respectively, as shown in the following formula:

$$v_7'=(v_5+v_6+2\cdot v_7+2\cdot v_8+2\cdot v_9)/8, v_8'=(2\cdot v_6 2\cdot v_7+2\cdot v_8+v_9+v_{10})/8 \quad (8)$$

Figure 12:
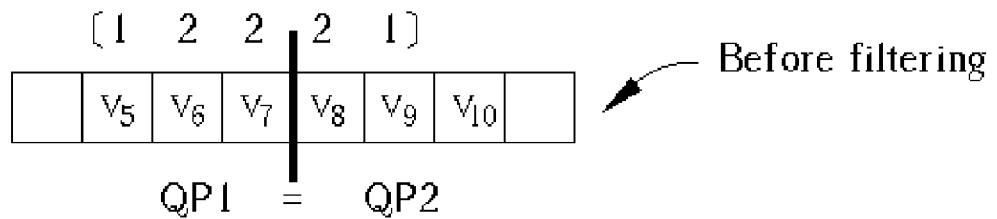
FIG. 12 illustrates using the symmetric F-3 filter to filter the pixels $v_7$ and $v_8$ belonging to first and second 8×8 blocks having equal QP values.
Figure 12:
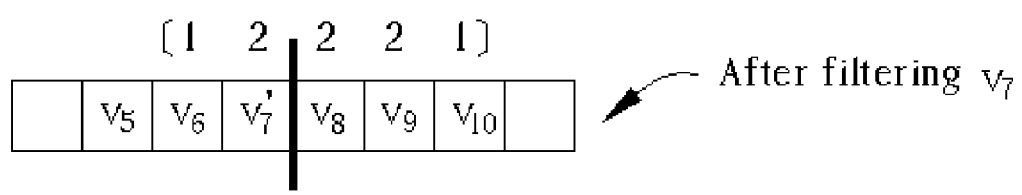
Figure 12:
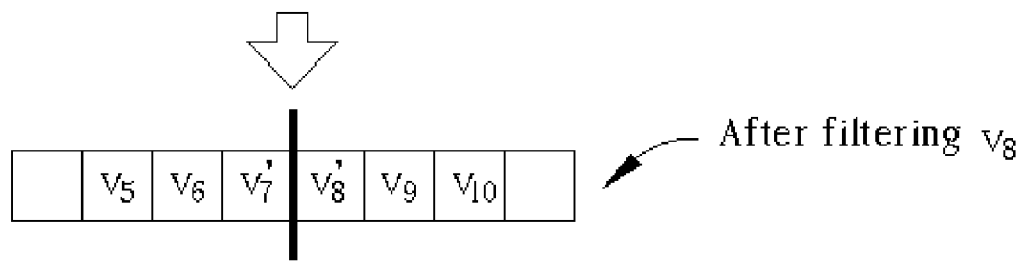
Figure 13:
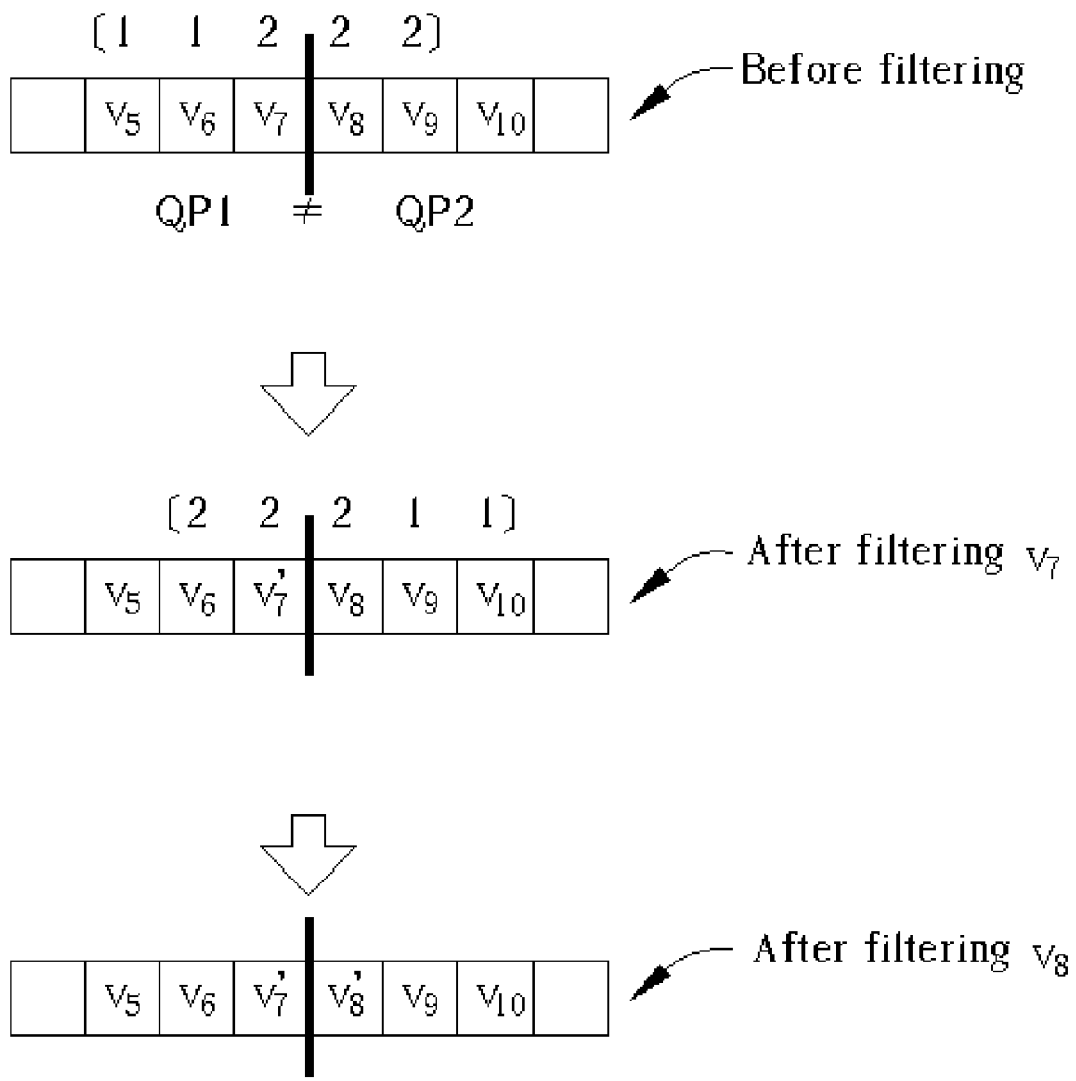
FIG. 13 illustrates using the asymmetric F-3 filter to filter the pixels $v_7$ and $v_8$ belonging to first and second 8×8 blocks having different QP values.

Please refer to FIG. 12 and FIG. 13. FIG. 12 illustrates using the symmetric F-3 filter being the 5-tap low-pass filter [1 2 2 2 1]/8 to filter the pixels $v_7$ and $v_8$ belonging to first and second 8×8 blocks having equal QP values. As shown in FIG. 12, the symmetric F-3 filter is first applied to $v_7$ and then applied to $v_8$ using the formulas (7) shown above. FIG. 13 illustrates using the asymmetric F-3 filter (5-tab low-pass filters being the 5-tap low-pass filters: [1 1 2 2 2]/8 and [2 2 2 1 1]/8 to filter the pixels $v_7$ and $v_8$ belonging to first and second 8×8 blocks having different QP values. Similar to as shown in FIG. 12, the asymmetric F-3 filter shown in FIG. 13 is first applied to $v_7$ and then applied to $v_8$ using the formulas (8) shown above. As previously noted, when using the asymmetric filters, slightly more weighting is given to the adjacent 8×8 block when compared with the symmetric filters. Intuitively, this has an effect similar to adjusting the QP values of the two adjacent 8×8 blocks to be equivalent as shown in FIG. 9.

Figure 14:
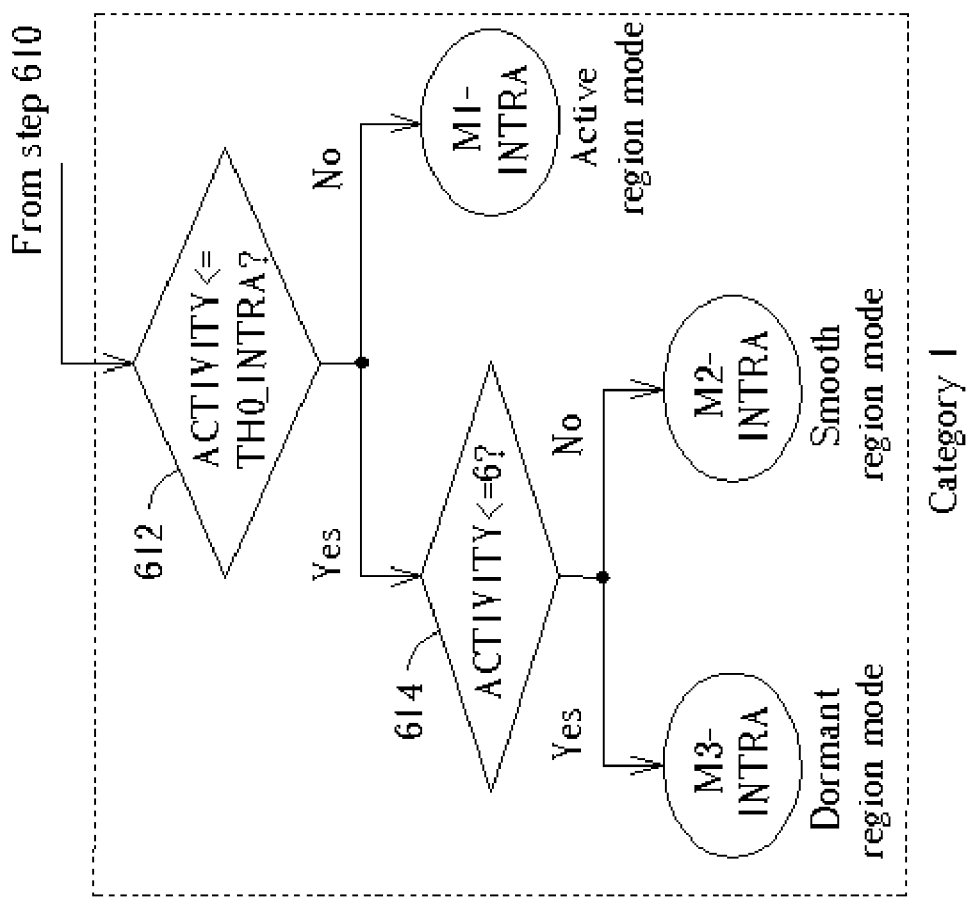
FIG. 14 is a flowchart further describing the mode decision procedure for Category 1.

FIG. 14 is a flowchart further describing the mode decision procedure for Category 1. For Category 1, up to four pixels from $v_6$ to $v_9$ around the block boundary 600 are filtered. As previously shown in FIG. 6, in step 610, if at least one of either the first block 602 or the second block 604 is an intra coded block, the block boundary 600 is determined to be in Category 1. FIG. 14 further details the threshold values required to determine the region mode. In step 612, if the activity value ACTIVITY, calculated according to the formula (1) specified above, is greater than a TH0_INTRA threshold value, the region mode is determined to be an active region. The TH0_INTRA threshold value distinguishes active regions from more flat regions for Category 1 and is a variable threshold value that adaptively changes according to the present invention. Further description of the determination of the TH0_INTRA threshold value will be provided later in the detailed description of the present invention. If ACTIVITY is less than or equal to the TH0_INTRA threshold value, the activity value ACTIVITY is compared with a fixed threshold having a value of 6. The fixed threshold is used to further divide the more flat regions into smooth and dormant regions in order to control the strength of the low-pass filtering operation. If ACTIVITY is greater than the fixed threshold, the region mode is determined to be a smooth region; otherwise, if ACTIVITY is less than or equal to the fixed threshold, the region mode is determined to be a dormant region. Although the value 6 for the fixed threshold has been determined using extensive experimentation, it should be noted the present invention is not limited to a fixed threshold value of 6. Other fixed threshold values can also be used while still following the teachings of the present invention.

Figure 15:
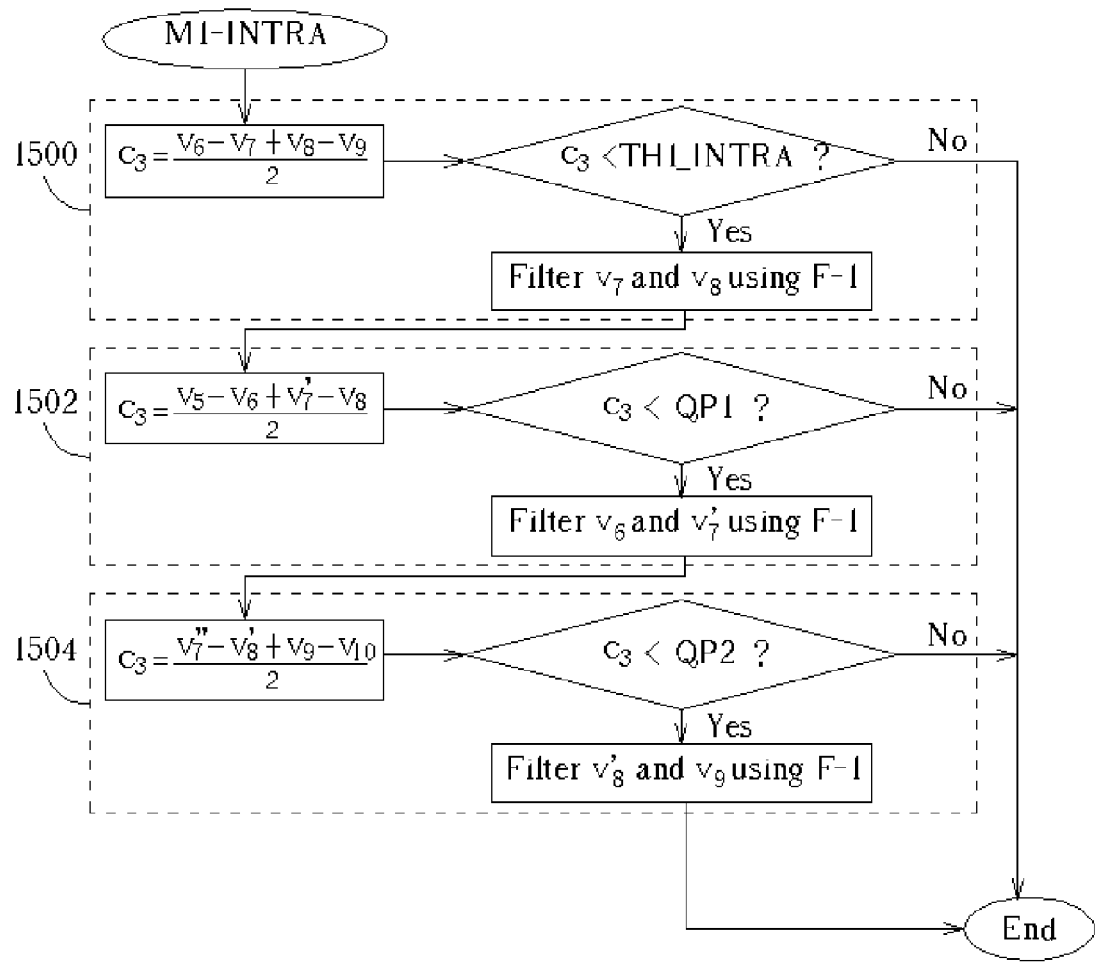
FIG. 15 shows a flowchart describing the operation of the de-blocking filtering unit for a Category 1 type block boundary when the region mode is determined to be M1-INTRA.
Figure 16:
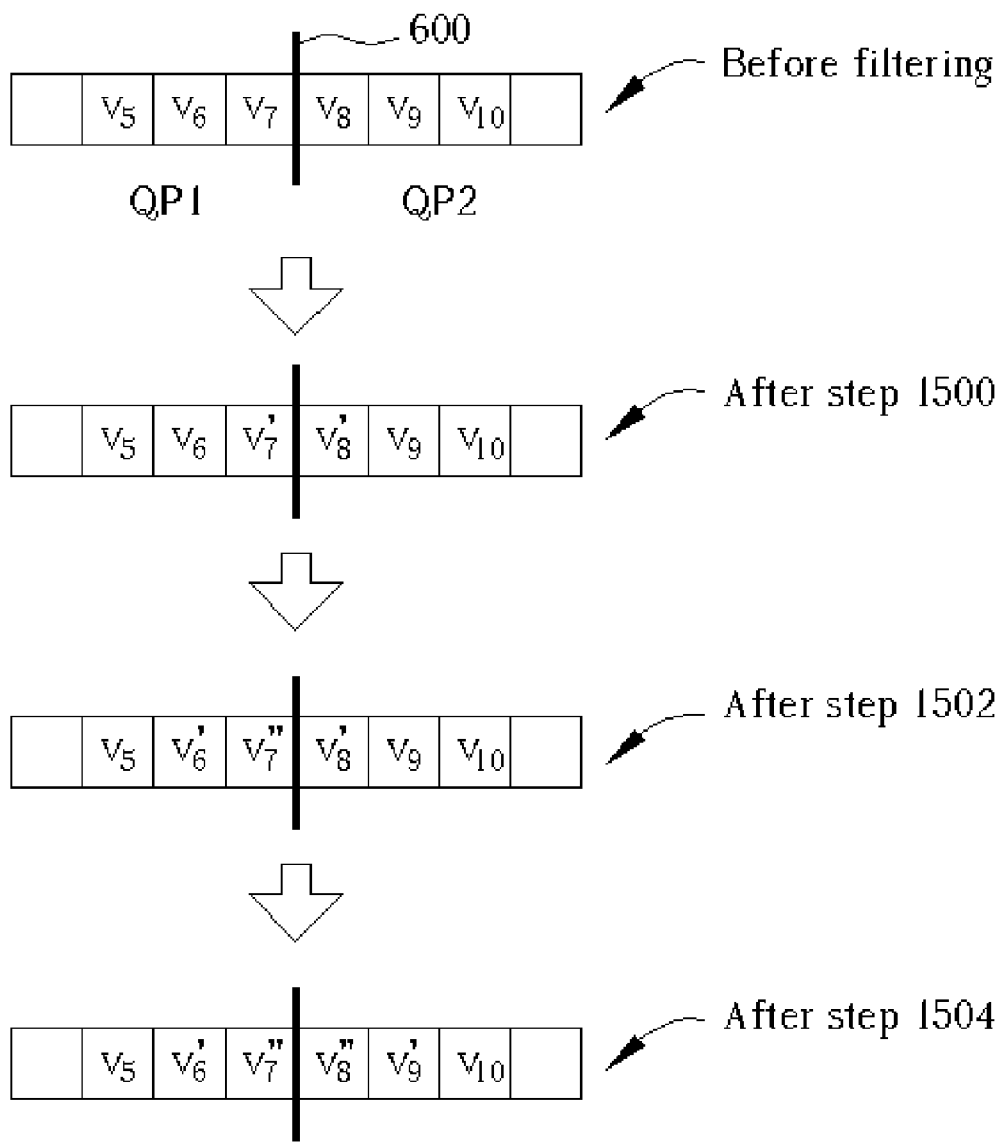
FIG. 16 shows the results of the filtering operations described in FIG. 15 on the pixels around the block boundary.

Please refer to FIG. 15 and FIG. 16. FIG. 15 shows a flowchart describing the operation of the de-blocking filtering unit 328 for a Category 1 type block boundary 600 when the region mode is determined to be M1-INTRA. FIG. 16 shows the results of the filtering operations described in FIG. 15 on the pixels around the block boundary 600. The flowchart shown in FIG. 15 includes the following steps:

Step 1500: Calculate the high frequency component $c_3$ of the HT as: $c_3=(v_6-v_7+v_8-v_9)/2$. Define another variable threshold TH1_INTRA and compare TH1_INTRA to $c_3$ to check if the block edge is indeed a real edge that should be present in the image. If the high frequency component $c_3$ is larger than or equal to TH1_INTRA, the block edge is assumed to be a real edge and filtering is not applied. Otherwise, filter $v_7$ and $v_8$ using the F-1 filter previously described. If filtering is performed in step 1500, proceed to step 1502.

Step 1502: Recalculate the high frequency component $c_3$ as: $c_3=(v_5-v_6+v_7''-v_8)/2$, where $v_7''$ is the filtered result from step 1500. If $c_3$ is smaller than QP1, then $v_6$ and $v_7''$ are filtered using the F-1 filter. In step 1502, because $v_6$ and $v_7''$ are coded with the same quantization parameter QP1, both weighting factors in formula (3) are set to ½. Proceed to step 1504.

Step 1504: Recalculate the high frequency component $c_3$ as: $c_3=(v_7''-v_8''+v_9-v_{10})/2$, where $v_7''$ is the filtered result from step 1502 and $v_8''$ is the filtered result from step 1500. If $c_3$ is smaller than QP2, then $v_8''$ and $v_9$ are filtered using the F-1 filter. In step 1504, because $v_8''$ and $v_9$ are coded with the same quantization parameter QP2, both weights in formula (3) are again set to ½.

Figure 17:
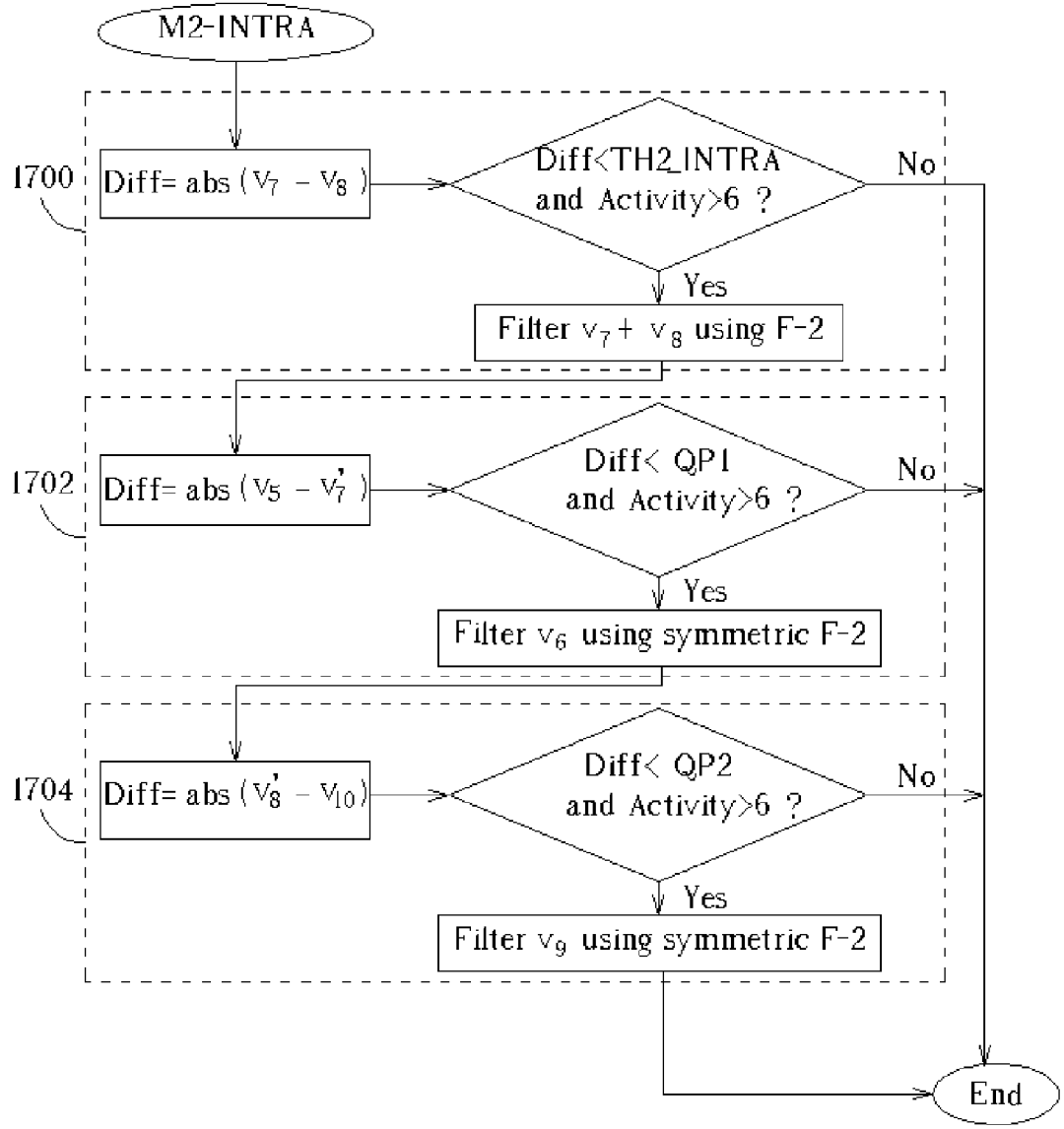
FIG. 17 shows a flowchart describing the operation of the de-blocking filtering unit for a Category 1 type block boundary when the region mode is determined to be M2-INTRA.
Figure 18:
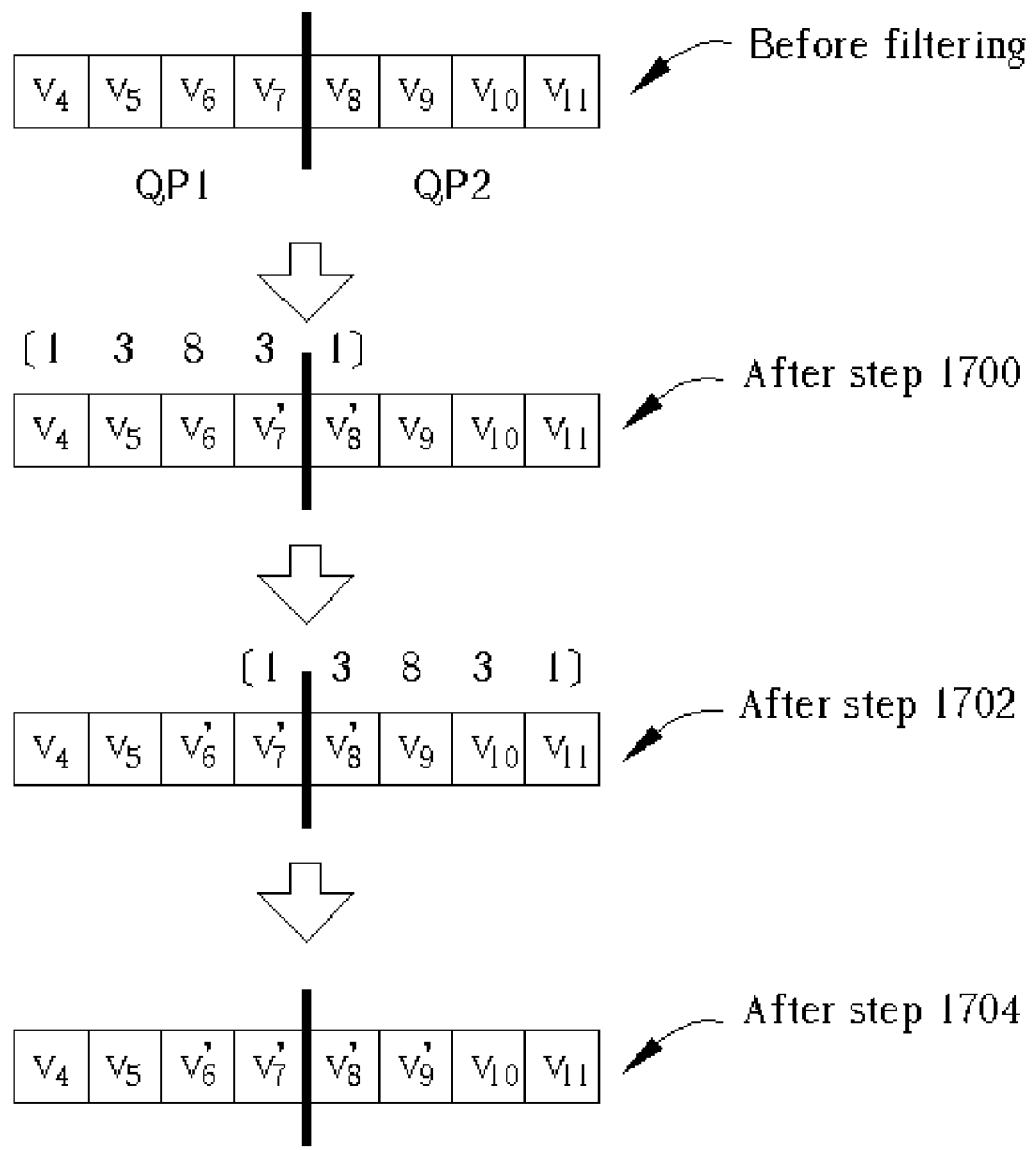
FIG. 18 shows the results of the filtering operations described in FIG. 17 on the pixels around the block boundary.

Please refer to FIG. 17 and FIG. 18. FIG. 17 shows a flowchart describing the operation of the de-blocking filtering unit 328 for a Category 1 type block boundary 600 when the region mode is determined to be M2-INTRA. FIG. 18 shows the results of the filtering operations described in FIG. 17 on the pixels around the block boundary 600. The flowchart shown in FIG. 17 includes the following steps:

Step 1700: Calculate a difference value as: diff=$|v_7-v_8|$. Define another variable threshold TH2_INTRA and compare TH2_INTRA to the difference value diff to check if the block edge is indeed a real edge. TH2_INTRA is a variable threshold and is also determined adaptively according to the present invention. The purpose of TH2_INTRA is the same as that of TH1_INTRA. If diff is smaller than TH2_INTRA and ACTIVITY is greater than the fixed threshold (in this embodiment the fixed threshold has a fixed value of 6), then filter $v_7$ and $v_8$ using the F-2 filter previously described. If QP1 is equal to QP2, use the symmetric F-2 filter; otherwise, if QP1 is not equal to QP2, use the asymmetric F-2 filter. If filtering is performed in step 1700, proceed to step 1702.

Step 1702: Recalculate the difference value as: diff=$|v_5-v_7''|$, where $v_7''$ is the filtered result from step 1700. If diff is smaller than QP1 and ACTIVITY is greater than the fixed threshold, filter $v_6$ using the symmetric weak low-pass filter F-2, i.e., $$v'_6=(v_4+3\cdot v_5+8\cdot v_6+3\cdot v_7'+v_8')/16$$

Step 1704: Recalculate the difference value as: diff=$|v_8''-v_{10}|$, where $v_8''$ is the filtered result from step 1702. If diff is smaller than QP2 and ACTIVITY is greater than the fixed threshold, filter $v_9$ using the symmetric weak low-pass filter F-2, i.e., $$v'_9=(v_7'3\cdot v_8'+8\cdot v_9+3\cdot v_{10}+v_{11})/16$$

Figure 19:
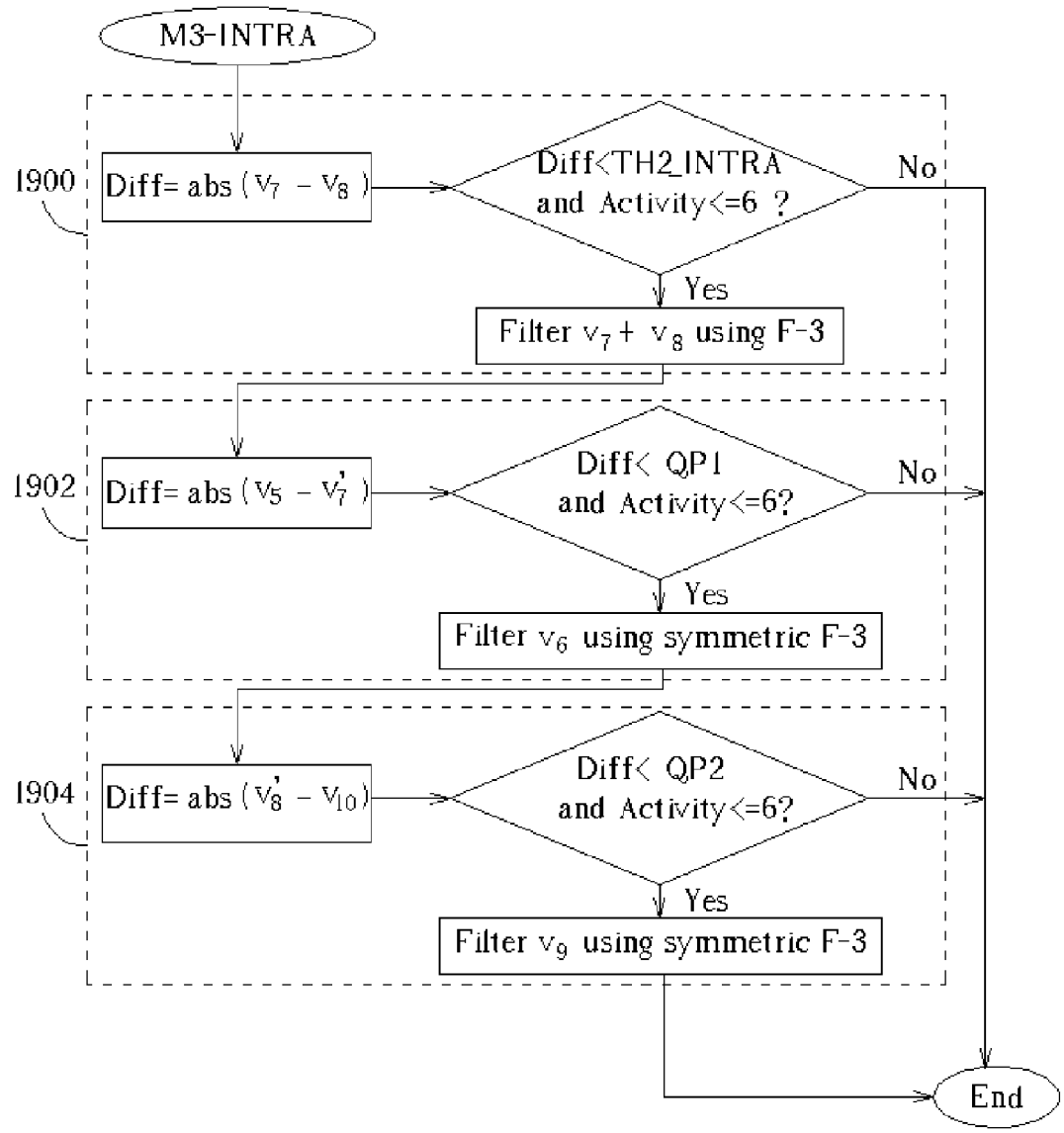
FIG. 19 shows a flowchart describing the operation of the de-blocking filtering unit for a Category 1 type block boundary when the region mode is determined to be M3-INTRA.
Figure 20:
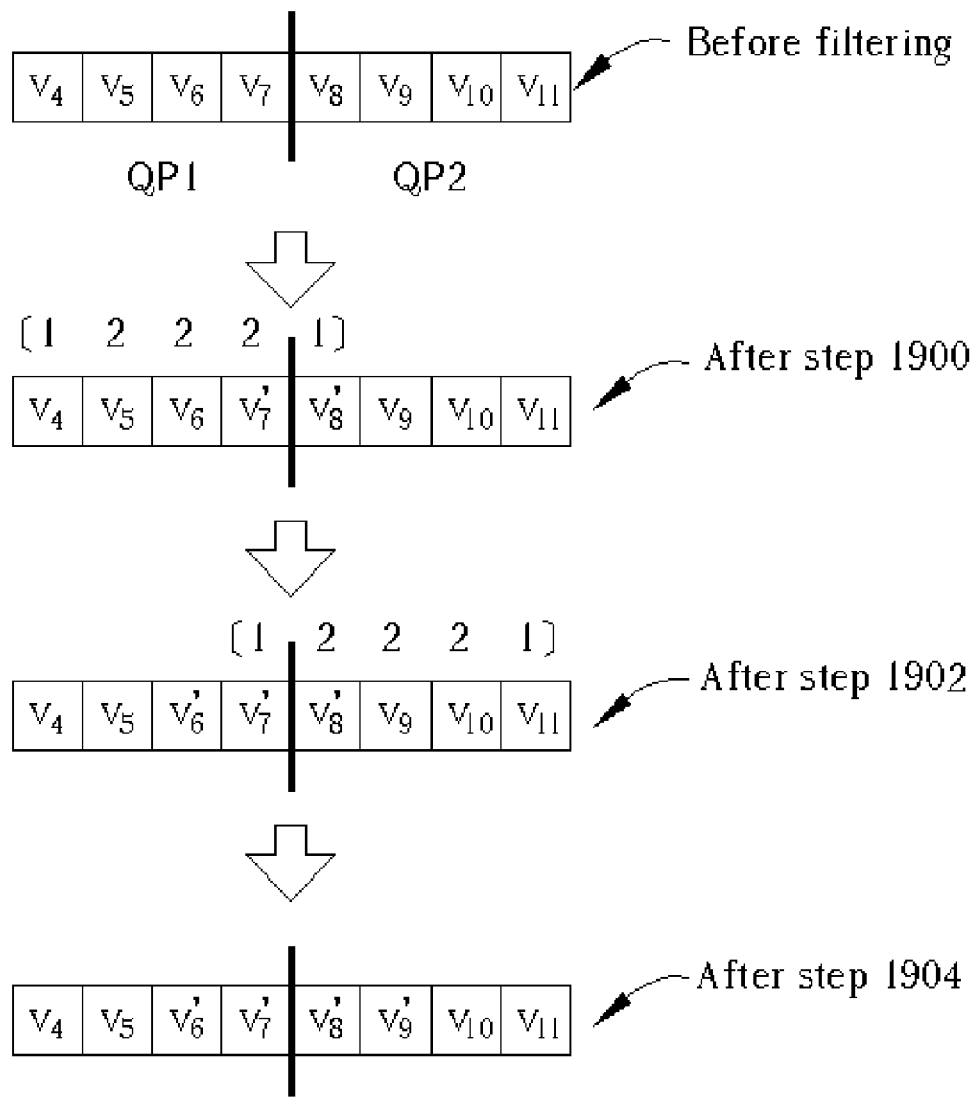
FIG. 20 shows the results of the filtering operations described in FIG. 19 on the pixels around the block boundary.

Please refer to FIG. 19 and FIG. 20. FIG. 19 shows a flowchart describing the operation of the de-blocking filtering unit 328 for a Category 1 type block boundary 600 when the region mode is determined to be M3-INTRA. FIG. 20 shows the results of the filtering operations described in FIG. 19 on the pixels around the block boundary 600. The flowchart shown in FIG. 19 includes the following steps:

Step 1900: Calculate a difference value as: diff=$|v_7-v_8|$. Compare TH2_INTRA to diff to check if the block edge is indeed a real edge. If diff is smaller than the variable threshold TH2_INTRA and ACTIVITY is less than or equal to the fixed threshold, then filter $v_7$ and $v_8$ using F-3. If QP1 is equal to QP2, use the symmetric F-3 filter; otherwise, if QP1 is not equal to QP2, use the asymmetric F-3 filter. If filtering is performed in step 1900, proceed to step 1902.

Step 1902: Recalculate the difference value as: diff=$|v_5-v_7''|$, where $v_7''$ is the filtered result from step 1900. If diff is smaller than QP1 and ACTIVITY is less than or equal to the fixed threshold, filter $v_6$ using the symmetric strong low-pass filter F-3, i.e., $$v'_6=(v_4+2\cdot v_5+2\cdot v_6+2\cdot v_7'+v_8')/8$$

Step 1904: Recalculate the difference value as: diff=$|v_8''-v_{10}|$, where $v_8''$ is the filtered result from step 1902. If diff is smaller than QP2 and ACTIVITY is less than or equal to the fixed threshold, filter $v_9$ using the symmetric strong low-pass filter F-3, i.e., $$v'_9=(v_7'+2\cdot v_8'+2\cdot v_9+2\cdot v_{10}+v_{11})/8$$

Figure 21:
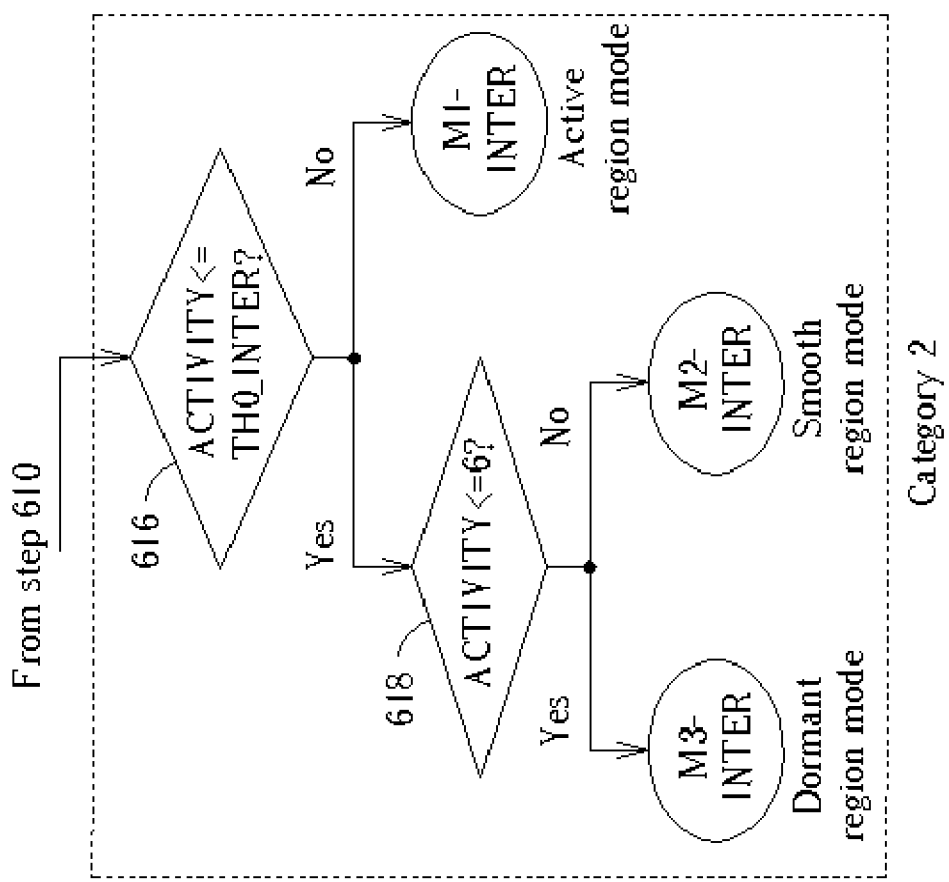
FIG. 21 is a flowchart further describing the mode decision procedure for Category 2.

FIG. 21 is a flowchart further describing the mode decision procedure for Category 2. As previously mentioned, because of motion compensated prediction, blocking artifacts may exist at any position inside inter coded blocks. Thus, for Category 2, up to eight pixels (from $v_4$ to $v_{11}$) around the block boundary 600 are filtered. As previously shown in FIG. 6, in step 610, if neither the first block 602 nor the second block 604 is an intra coded block, the block boundary 600 is determined to be in Category 2. FIG. 21 further details the threshold values required to determine the region mode. In step 616, if the activity value ACTIVITY, calculated according to formula (1) specified above, is greater than a TH0_INTER threshold value, the region mode is determined to be an active region. The TH0_INTER threshold value distinguishes active regions from more flat regions for Category 2 and is a variable threshold value that adaptively changes according to the present invention. Further description of the determination of the TH0_INTER threshold value will be provided later in the detailed description of the present invention. If ACTIVITY is less than or equal to the TH0_INTER threshold value, the activity value ACTIVITY is compared with the fixed threshold (having a value of 6 in this embodiment). As in Category 1, the fixed threshold is used to further divide the more flat regions into smooth and dormant regions in order to control the strength of the low-pass filtering operation. If the ACTIVITY is greater than the fixed threshold, the region mode is determined to be a smooth region; otherwise, if ACTIVITY is less than or equal to the fixed threshold, the region mode is determined to be a dormant region. Again, although the value 6 for the fixed threshold has been determined to be a suitable value using experimental results, it should be noted the present invention is not limited to a fixed threshold value of 6. Other fixed threshold values can also be used while still following the teachings of the present invention.

Figure 22:
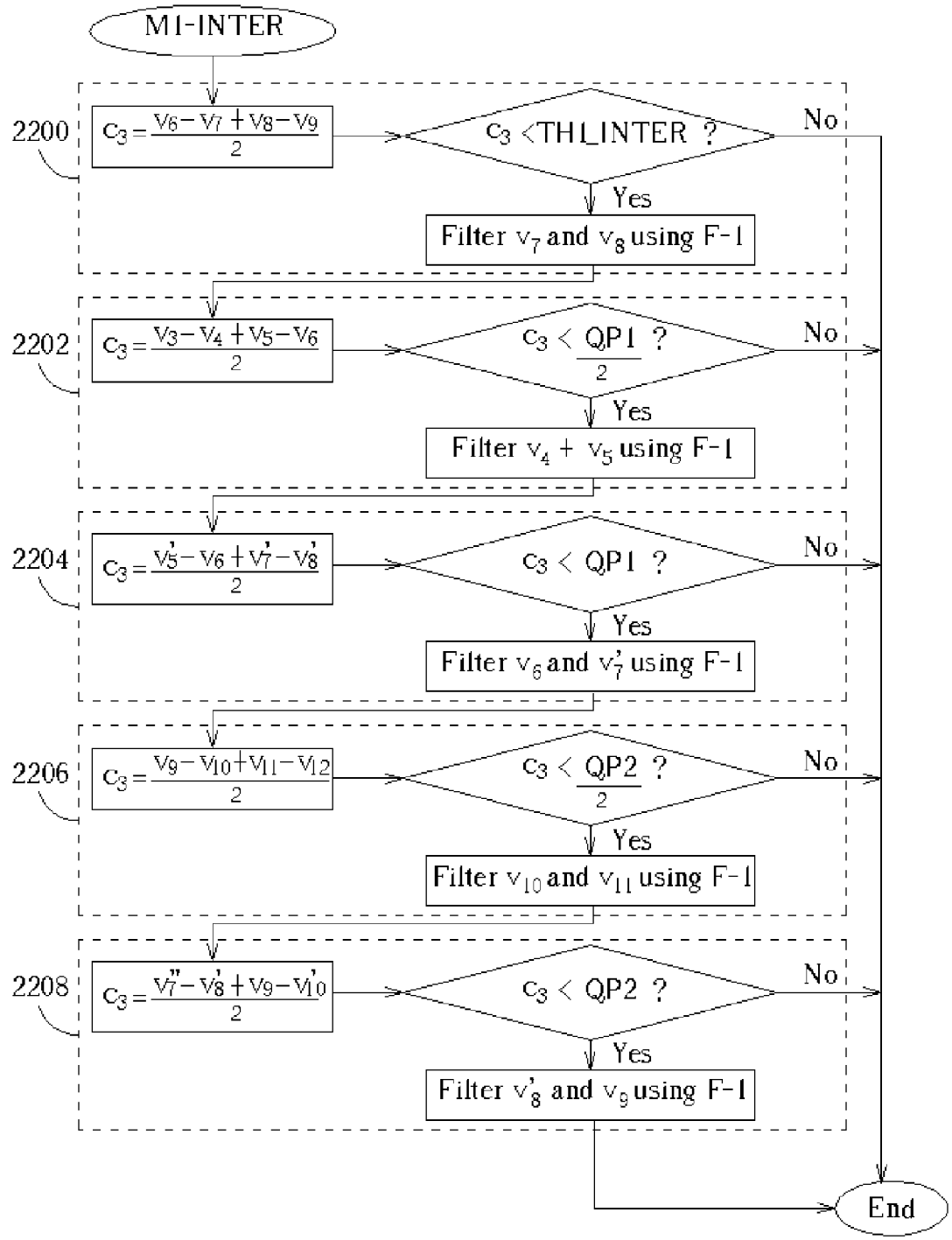
FIG. 22 shows a flowchart describing the operation of the de-blocking filtering unit for a Category 2 type block boundary when the region mode is determined to be M1-INTER.
Figure 23:
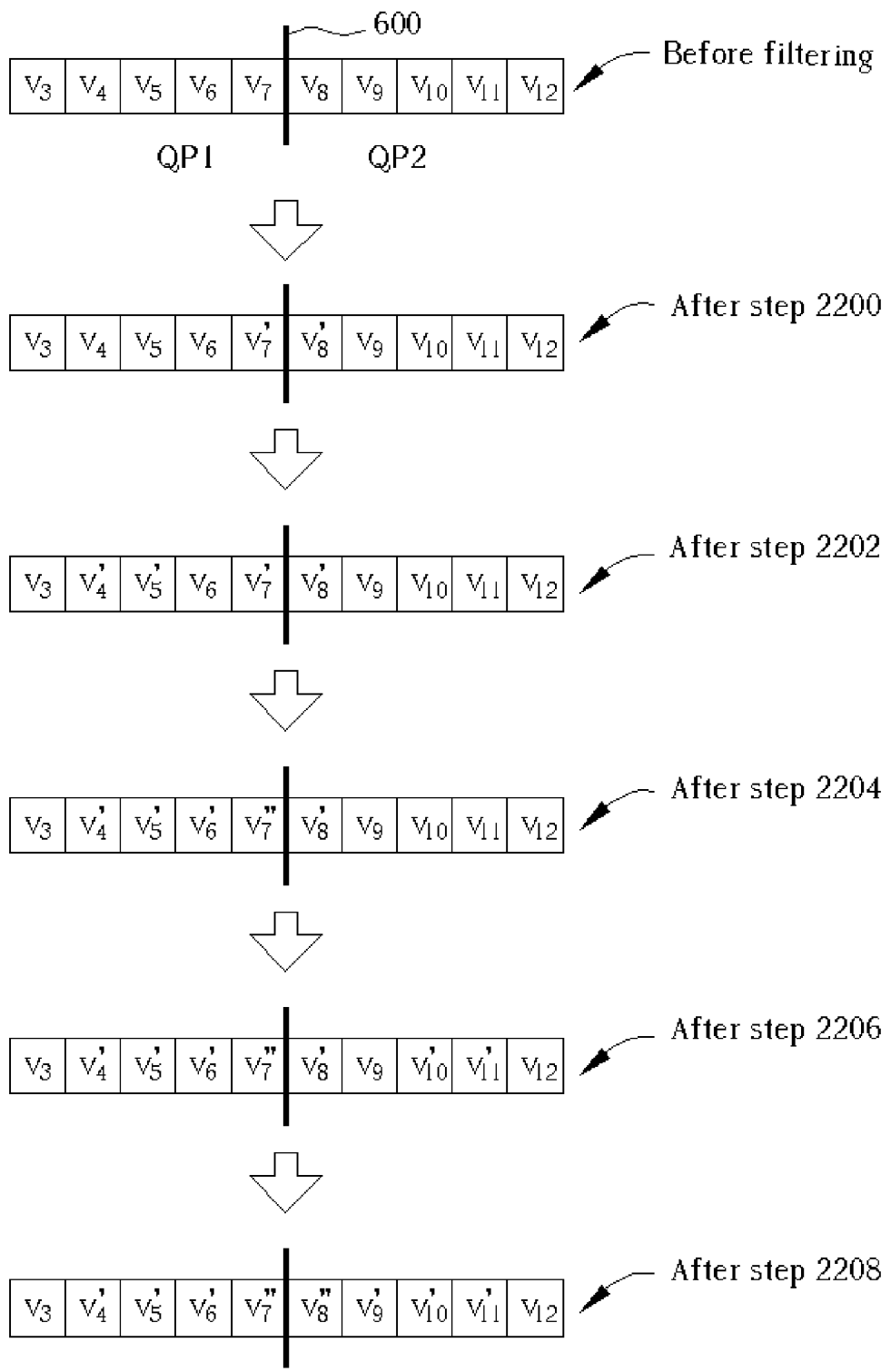
FIG. 23 shows the results of the filtering operations described in FIG. 22 on the pixels around the block boundary.

Please refer to FIG. 22 and FIG. 23. FIG. 22 shows a flowchart describing the operation of the de-blocking filtering unit 328 for a Category 2 type block boundary 600 when the region mode is determined to be M1-INTER. FIG. 23 shows the results of the filtering operations described in FIG. 22 on the pixels around the block boundary 600. The flowchart shown in FIG. 22 includes the following steps:

Step 2200: Calculate the high frequency component $c_3$ of the HTas: $c_3=(v_6-v_7+v_8-v_9)/2$. Define another variable threshold TH1_INTER and compare TH1_INTER to $c_3$ to check if the block edge is indeed a real edge. If the high frequency component $c_3$ is larger than or equal to TH1_INTER, the block edge is assumed to be a real edge and filtering is not applied. Otherwise, filter $v_7$ and $v_8$ using the F-1 filter. If filtering is performed in step 2200, proceed to step 2202.

Step 2202: Recalculate the high frequency component $c_3$ as: $c_3=(v_3-v_4+v_5-v_6)/2$. If $c_3$ is smaller than QP1/2, then filter $v_4$ and $v_5$ using the F-1 filter. In step 2202, because $v_4$ and $v_5$ are coded with the same quantization parameter QP1, both weights in formula (3) are again set to ½.

Step 2204: Recalculate the high frequency component $c_3$ as: $c_3=(v_5''-v_6+v_7''-v_8'')/2$, where $v_7''$ and $v_8''$ are the filtered results from step 2200, and $v_5''$ is the filtered result from step 2202. If $c_3$ is smaller than QP1, filter $v_6$ and $v_7''$ using the F-1 filter. In step 2204, because $v_6$ and $v_7''$ are coded with the same quantization parameter QP1, both weights in formula (3) are again set to ½.

Step 2206: Recalculate the high frequency component $c_3$ as: $c_3=(v_9-v_{10}+v_{11}-v_{12})/2$. If $c_3$ is smaller than QP2/2, filter $v_{10}$ and $v_{11}$ using the F-1 filter. In step 2206, because $v_{10}$ and $v_{11}$ are coded with the same quantization parameter QP2, both weights in formula (3) are again set to ½.

Step 2208: Recalculate the high frequency component $c_3$ as: $c_3=(v_7''-v_8''+v_9-v_{10}'')/2$, where $v_7''$ is the filtered result from step 2204, and $v_8''$ and $v_{10}''$ are the filtered results from steps 2200 and step 2206, respectively. If $c_3$ is smaller than QP2, filter $v_8''$ and $v_9$ using the F-1 filter. In step 2208, because $v_8$ and $v_9$ are coded with the same quantization parameter QP2, both weights in formula (3) are again set to ½.

Figure 24:
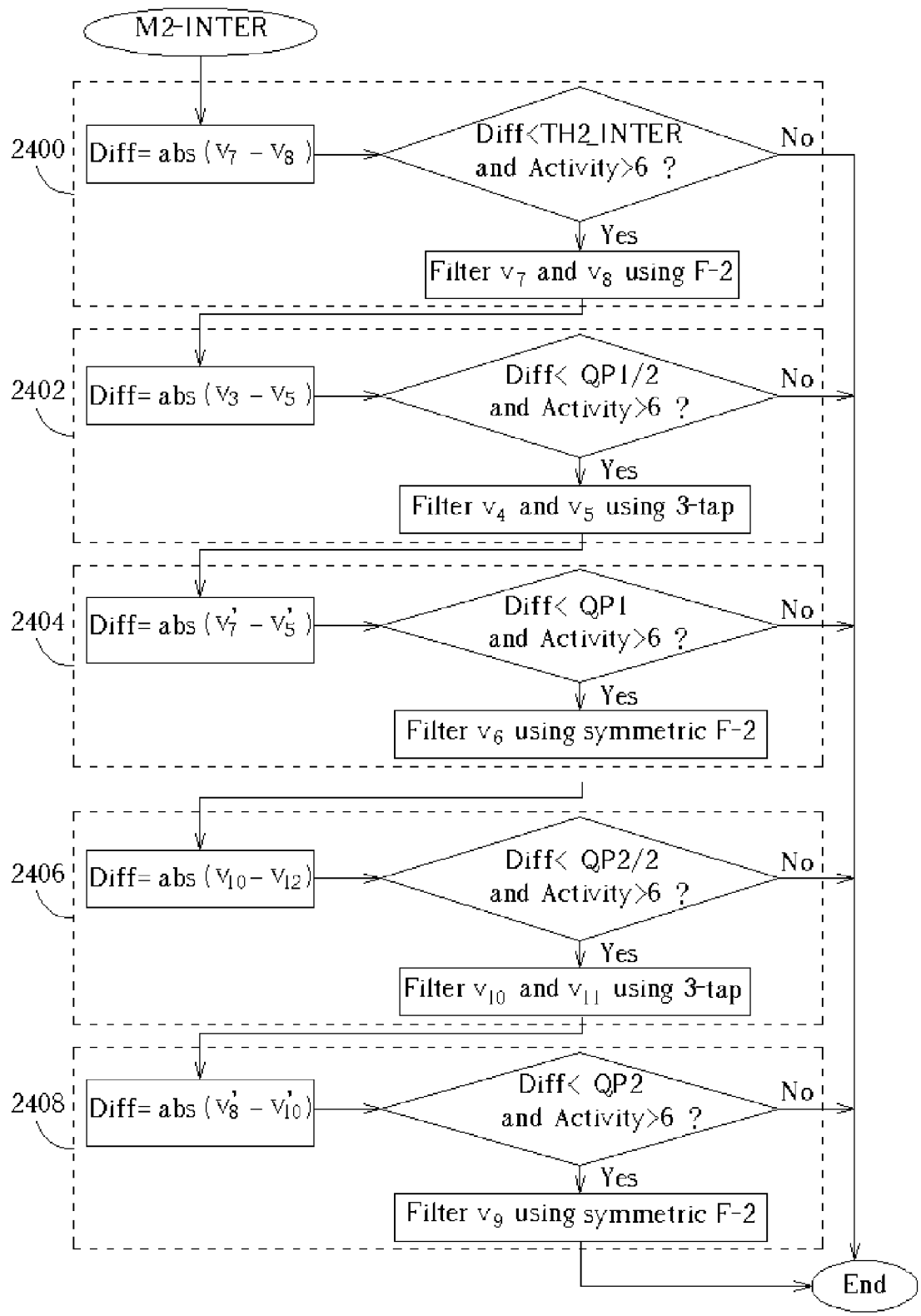
FIG. 24 shows a flowchart describing the operation of the de-blocking filtering unit for a Category 2 type block boundary when the region mode is determined to be M2-INTER.
Figure 25:
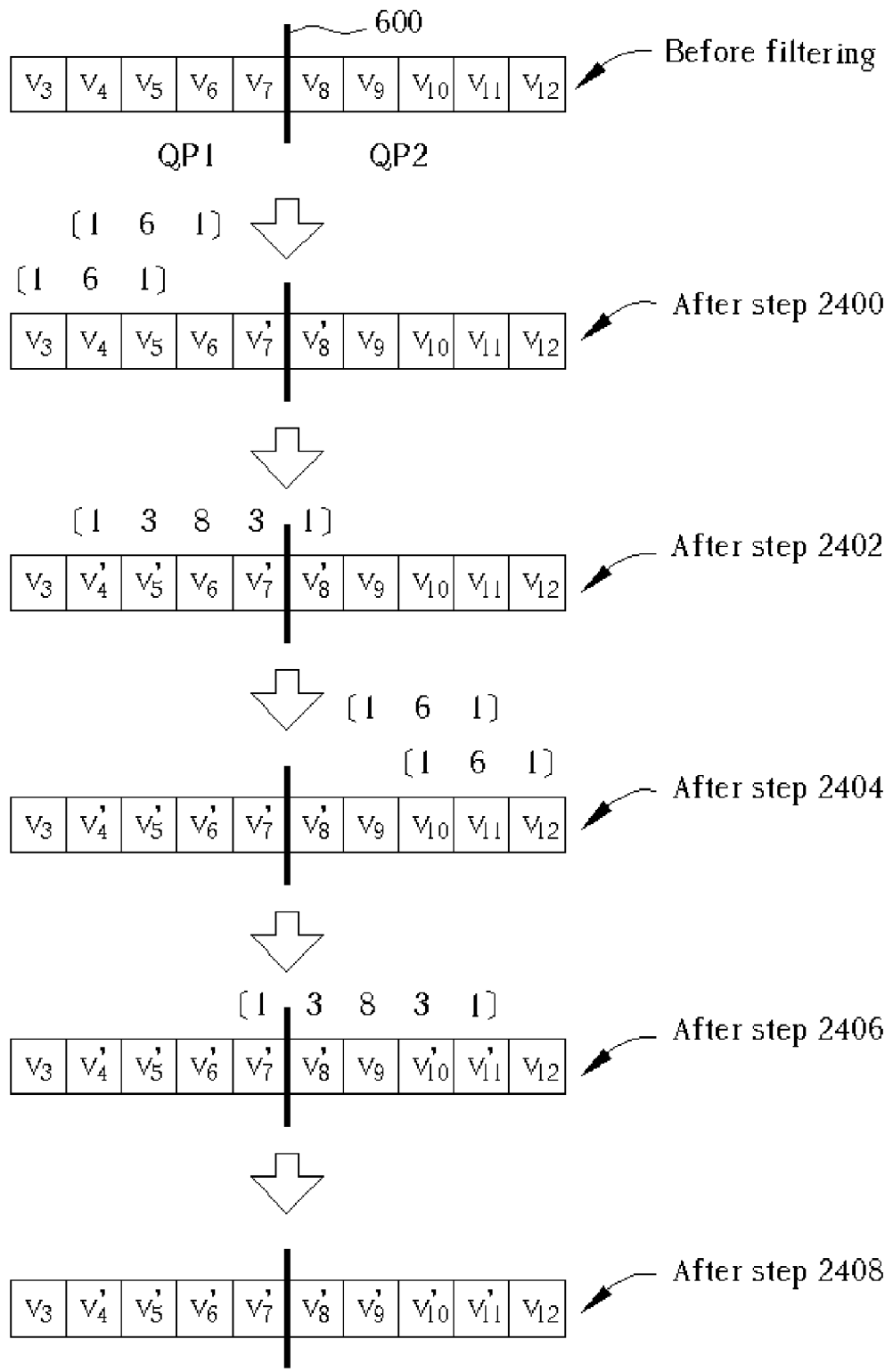
FIG. 25 shows the results of the filtering operations described in FIG. 24 on the pixels around the block boundary.

Please refer to FIG. 24 and FIG. 25. FIG. 24 shows a flowchart describing the operation of the de-blocking filtering unit 328 for a Category 2 type block boundary 600 when the region mode is determined to be M2-INTER. FIG. 25 shows the results of the filtering operations described in FIG. 24 on the pixels around the block boundary 600. The flowchart shown in FIG. 24 includes the following steps:

Step 2400: Calculate a difference value as: diff=$|v_7-v_8|$. Define another variable threshold TH2_INTER and compare TH2_INTER to diff to check if the block edge is indeed a real edge. TH2_INTER is a variable threshold and is also determined adaptively according to the present invention. The purpose of TH2_INTER is the same as that of TH1_INTER. If diff is smaller than TH2_INTER and ACTIVITY is greater than the fixed threshold, then filter $v_7$ and $v_8$ using the F-2 filter. If QP1 is equal to QP2, use the symmetric F-2 filter; otherwise, if QP1 is not equal to QP2, use the asymmetric F-2 filter. If filtering is performed in step 2400, proceed to step 2402.

Step 2402: Recalculate the difference value as: diff=$|v_3-v_5|$. If diff is smaller than QP1/2 and ACTIVITY is greater than the fixed threshold, filter $v_4$ and $v_5$ using a 3-tap low-pass filter [1 6 1]/8, i.e., $$v_4'=(v_3+6 \cdot v_4+v_5)/8, v_5'=(v_4+6 \cdot v_5+v_6)/8$$

Step 2404: Recalculate the difference value as: diff=$|v_7''-v_5''|$, where $v_7''$ is the filtered result from step 2400 and $v_5''$ is the filtered result from step 2402. If diff is smaller than QP1 and ACTIVITY is greater than the fixed threshold, filter $v_6$ using the symmetric weak low-pass filter F-2, i.e., $$v_6'=(v_4'3 \cdot v_5'+8 \cdot v_6 3 \cdot v_7'+v_8')/16$$

Step 2406: Recalculate the difference value as: diff=$|v_{10}-v_{12}|$. If diff is smaller than QP2/2 and ACTIVITY is greater than the fixed threshold, filter $v_{11}$ and $v_{10}$ using the 3-tap low-pass filter [1 6 1]/8, i.e., $$v_{11}'=(v_{10}+6 \cdot v_{11}+v_{12})/8, v_{10}'=(v_9+6 \cdot v_{10}+v_{11})/8$$

Step 2408: Recalculate the difference value as: diff=$|v_8''-v_{10}''|$, where $v_8''$ is the filtered result from step 2400 and $v_{10}''$ is the filtered result from step 2406. If diff is smaller than QP2 and ACTIVITY is greater than the fixed threshold, filter $v_9$ using the symmetric weak low-pass filter F-2, i.e., $$v_9'=(v_7'+3 \cdot v_8'+8 \cdot v_9+3 \cdot v_{10}'+v_{11}')/16$$

Figure 26:
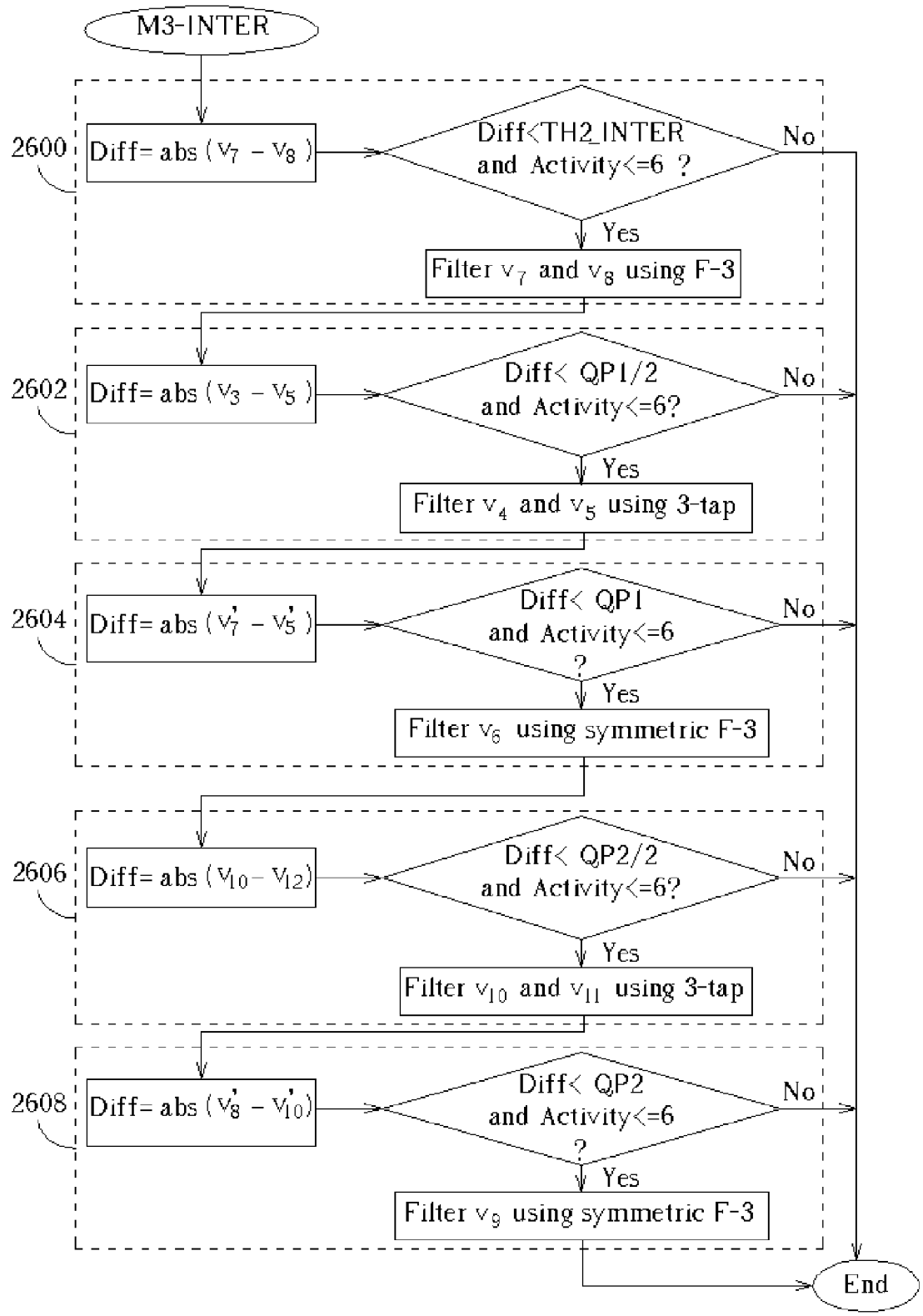
FIG. 26 shows a flowchart describing the operation of the de-blocking filtering unit for a Category 2 type block boundary when the region mode is determined to be M3-INTER.
Figure 27:
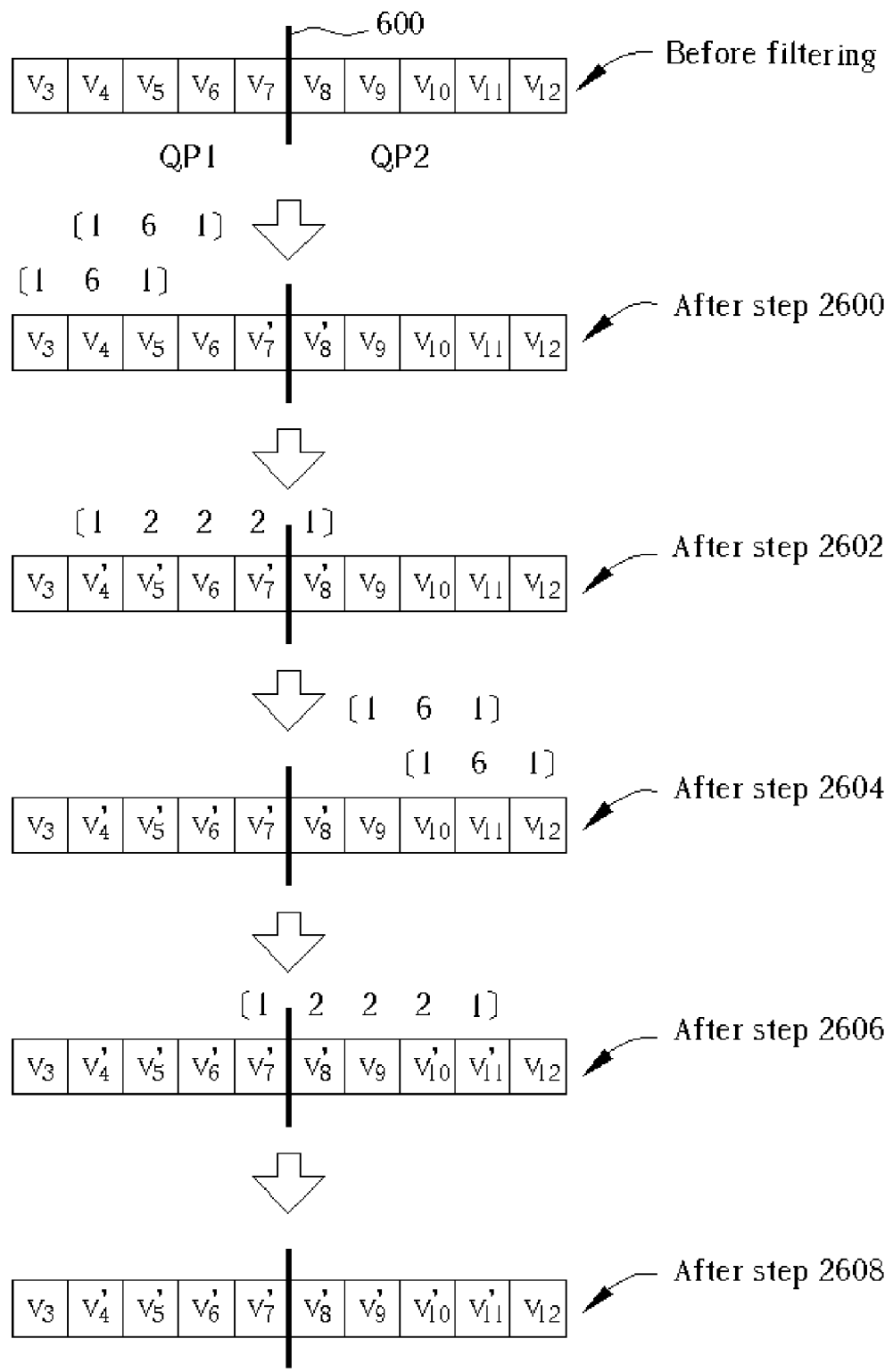
FIG. 27 shows the results of the filtering operations described in FIG. 26 on the pixels around the block boundary.

Please refer to FIG. 26 and FIG. 27. FIG. 26 shows a flowchart describing the operation of the de-blocking filtering unit 328 for a Category 2 type block boundary 600 when the region mode is determined to be M3-INTER. FIG. 27 shows the results of the filtering operations described in FIG. 26 on the pixels around the block boundary 600. The flowchart shown in FIG. 26 includes the following steps:

Step 2600: Calculate a difference value as: diff=$|v_7-v_8|$. Compare TH2_INTER to diff to check if the block edge is indeed a real edge. If diff is smaller than TH2_INTER and ACTIVITY is less than or equal to the fixed threshold, filter $v_7$ and $v_8$ using the F-3 filter. If QP1 is equal to QP2, use the symmetric F-3 filter; otherwise, if QP1 is not equal to QP2, use the asymmetric F-3 filter. If filtering is performed in step 2600, proceed to step 2602.

Step 2602: Recalculate the difference value as: diff=$|v_3-v_5|$. If diff is smaller than QP1/2 and ACTIVITY is less than or equal to the fixed threshold, filter $v_4$ and $v_5$ using the 3-tap low-pass filter [1 6 1]/8, i.e., $$v_4'=(v_3+6 \cdot v_4+v_5)/8, v_5'=(v_4+6 \cdot v_5+v_6)/8$$

Step 2604: Recalculate the difference value as: diff=$|v_7''-v_5''|$, where $v_7''$ is the filtered result from step 2600 and $v_5''$ is the filtered result from step 2602. If diff is smaller than QP1 and ACTIVITY is less than or equal to the fixed threshold, filter $v_6$ using the symmetric weak low-pass filter F-3, i.e., $$v_6'=(v_4'+2 \cdot v_5'+2 \cdot v_6+2 \cdot v_7'+v_8')/8$$

Step 2606: Recalculate the difference value as: diff=$|v_{10}-v_{12}|$. If diff is smaller than QP2/2 and ACTIVITY is less than or equal to the fixed threshold, filter $v_{11}$ and $v_{10}$ using the 3-tap low-pass filter [1 6 1]/8, i.e., $$v_{11}'=(v_{10}+6 \cdot v_{11}+v_{12})/8, v_{10}'=(v_9+6 \cdot v_{10}+v_{11})/8$$

Step 2608: Recalculate the difference value as: diff=$|v_8''-v_{10}''|$, where $v_8''$ is the filtered result from step 2600 and $v_{10}''$ is the filtered result from step 2606. If diff is smaller than QP2 and ACTIVITY is less than or equal to the fixed threshold, filter $v_9$ using the symmetric weak low-pass filter F-3, i.e., $$v_9'=(v_7'+2 \cdot v_8'+2 \cdot v_9+2 \cdot v_{10}'+v_{11}')/8$$

It should be noted that the filtering order for Category 2 filtering operations is not sequential from pixels at the block boundary 600 to pixels furthest away from the block boundary. Instead, after filtering the pixels at the block boundary 600, pixels further away from the block boundary 600 are filtered. Afterwards, pixels between the pixels at the block boundary 600 and the pixels further away from the block boundary 600 are filtered. By doing so, the error caused by filtering the pixels at the block boundary 600 is not propagated to inner-block pixels further away from the block boundary 600.

Figure 28:
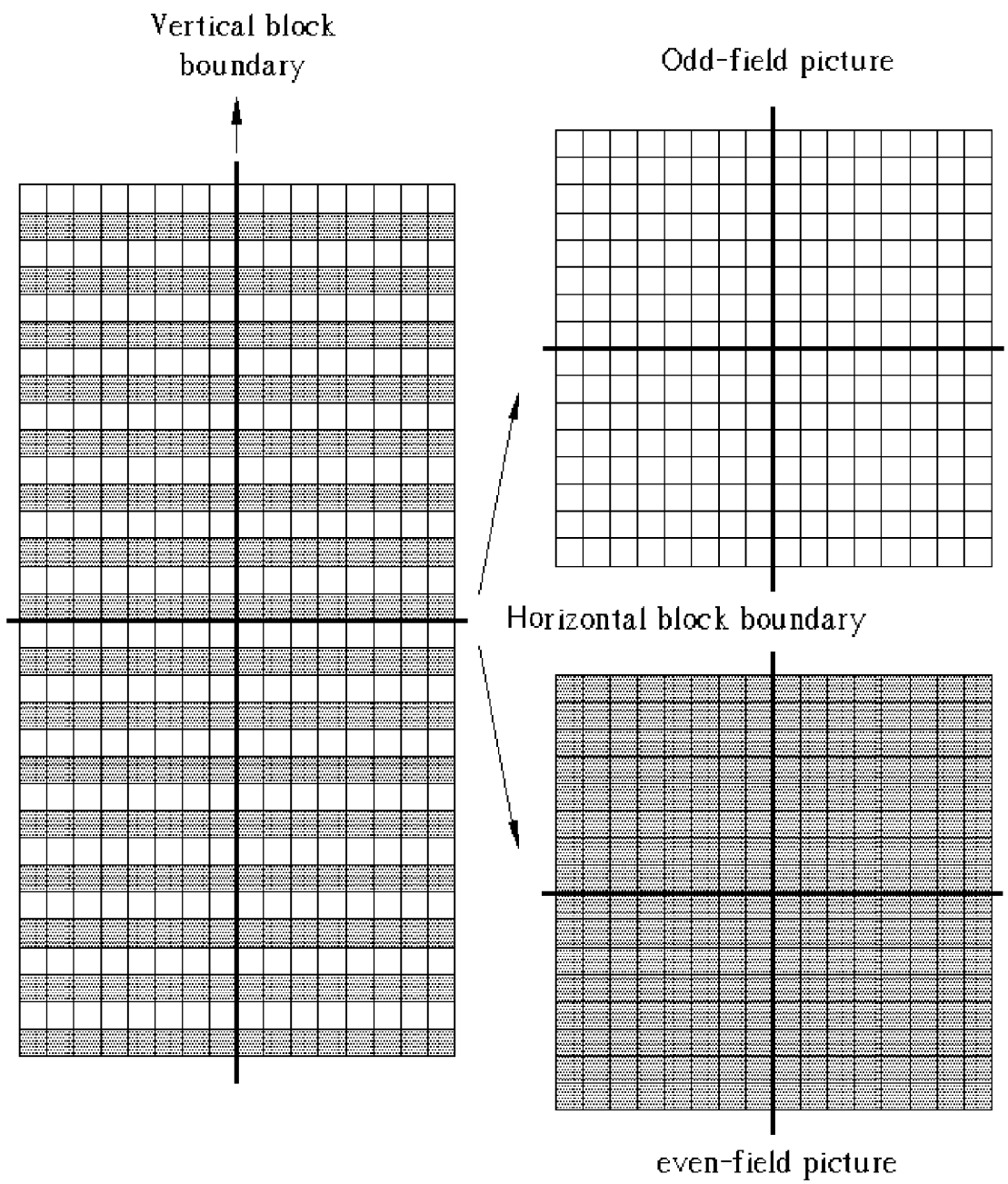
FIG. 28 shows a horizontal boundary in two field pictures corresponding to a single frame in interlaced video.

FIG. 28 shows a horizontal boundary in two field pictures corresponding to a single frame in interlaced video. By slightly modifying the filtering operation for field-coded pictures (used to form interlaced video), the present invention provides a method that enables the de-blocking filtering unit 328 to be used for field-coded pictures. For interlaced video, one frame is coded with two field-coded pictures: an odd-field picture and an even-field picture. As such, special consideration needs to be taken when performing vertical filtering, i.e., horizontal boundary filtering. According to the present invention, the same filter is applied to vertical filtering of filed-coded picture with only a small and easy to implement modification. For the active region mode, the same filter F-1 is used except that high frequency component $c_3$ is reduced to one half, instead of 0, i.e., Δ in formula (2) is $c_3/2$. Additionally, the filtered pixels are clipped into a narrower range as follows:

$$v_7' = v_7 + \Delta 1, \quad v_8' = v_8 - \Delta 2 \quad \text{where}$$

$$\Delta 1 = \text{clip}\left(\Delta \cdot WT1, 0, \frac{(v_8 - v_7)}{2} \cdot WT1\right),$$

$$\Delta 2 = \text{clip}\left(\Delta \cdot WT2, 0, \frac{(v_8 - v_7)}{2} \cdot WT2\right)$$

For the smooth and dormant region modes, pixel interpolation is performed before filtering. Since the distance between two vertically adjacent pixels in a field-coded picture is actually equivalent to 2 pixels in a frame-coded picture, the pixel value between these two vertically adjacent pixels can be estimated using an interpolation technique. Although a more sophisticated interpolation calculation may give slightly better performance, a preferred embodiment of the present invention uses simple averaging in order to reduce the computational complexity of the interpolation unit 330.

Figure 29:
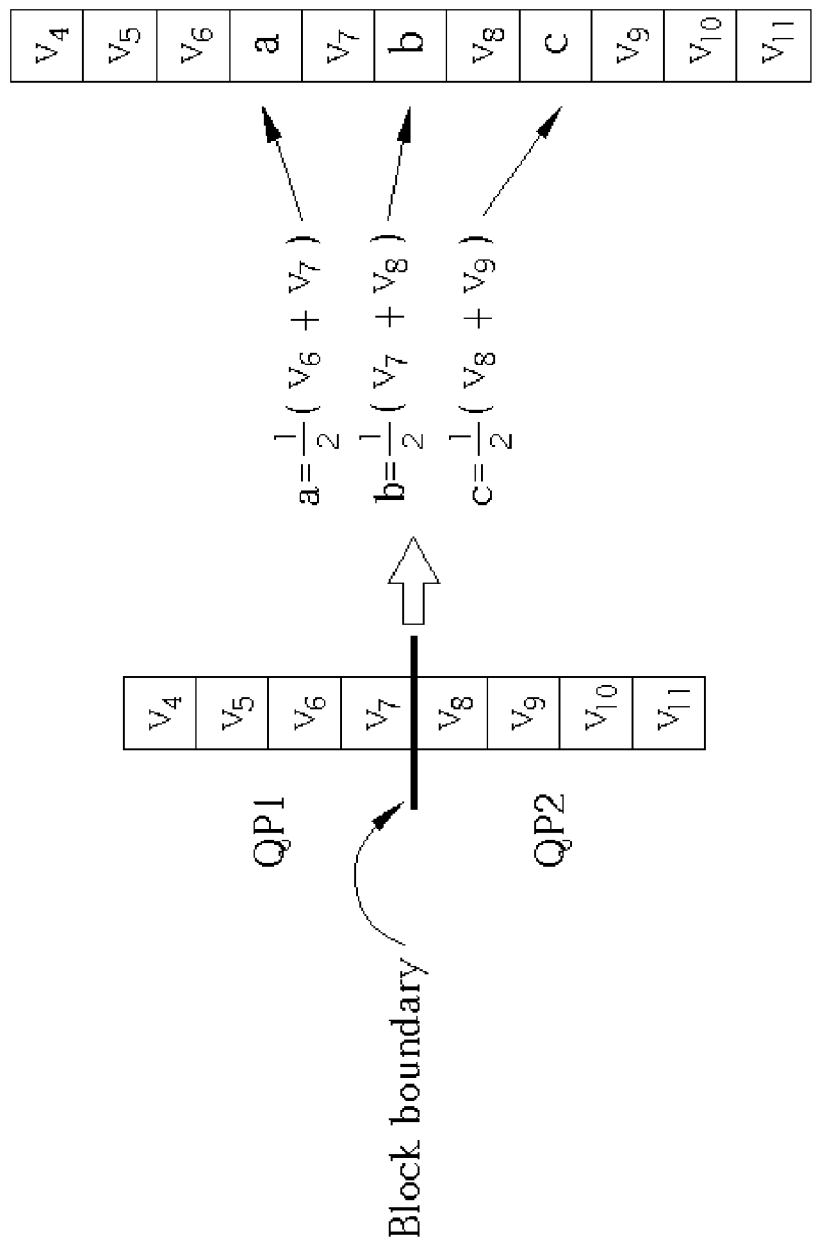
FIG. 29 shows the averaging operations used to implement the interpolation operations for horizontal boundary filtering of a field-coded picture according to the present invention.

FIG. 29 shows the averaging operations used to implement the interpolation operations for horizontal boundary filtering of a field-coded picture according to the present invention. After interpolation, the same filtering operations as previously described for frame-coded pictures is applied to the field-coded pictures. For example, suppose that $v_7$ and $v_8$ are to be filtered with the symmetric low-pass filter F-2. In this case, the after filtered results $v_7''$ and $v_8''$ are as calculated as follows:

$$v_7'' = (v_6 + 3 \cdot a + 8 \cdot v_7 + 3 \cdot b + v_8)/16, \quad v_8'' = (v_7 + 3 \cdot b + 8 \cdot v_8 + 3 \cdot c + v_9)/16$$

where a, b, and c are the interpolated pixel values as shown in FIG. 29.

Most of the prior art as well as the present invention use several threshold values to control the filtering strength and to make filtering decisions. Accordingly, threshold values used in the adaptive de-blocking filtering unit 328 have a great influence on the de-blocking filtering performance. That is, a good threshold selection method is an important factor in the performance of an adaptive de-blocking filter. However, thresholds in most of the prior art de-blocking filters are usually decided without careful consideration despite their importance. The present invention provides a general guideline for threshold selection and uses linear functions of several parameters to determine the threshold values.

The strength of a blocking artifact depends on the following five factors:

(1) The QP values of the two adjacent 8×8 blocks that form the block boundary. A coarser quantization step makes blocking artifacts more visible.

(2) The difference of QP values of two adjacent 8×8 blocks. Blocking artifacts tend to be stronger when adjacent blocks are coded with different quantization parameters. This is true even if the sum of the QP values of two 8×8 blocks having different QP values is equal to the sum of the QP values of two 8×8 blocks having equal QP values. The blocking artifact between the two 8×8 blocks having different QP values will tend to be stronger.

(3) Block and picture coding types. Inter-coded blocks are generally smoother than intra-coded blocks because adding predicted signals using motion compensation and residual error signals has an effect similar to averaging. This tends to reduce noise, which reduces blocking artifacts. For the same reason, B-pictures are even smoother than P-pictures, and therefore have reduced blocking artifacts.

(4) Size of motion vector. When a large motion exists in a picture, the picture tends to be smoother and have reduced blocking artifacts.

(5) If the 8×8 block boundary is also MB boundary, in P- and B-pictures, blocking artifacts tends to be more visible.

Threshold values should be determined based on the strength of the blocking artifact. Therefore, the present invention considers the above five factors when deciding the threshold values. Moreover, the present invention introduces a parameter called a user-defined offset (UDO), which enables a trade-off between subjective quality and objective measurement quality depending on the user's preference. For example, using a large UDO increases the amount of filtering and therefore the amount of smoothing. On the contrary, using a small UDO decreases the amount of filtering so more image details are preserved. The thresholds can be obtained either from pre-generated tables or from a mathematical formula. While the present invention provides simple mathematical formulas, the threshold tables can also be generated and used to perform a look-up operation. The threshold tables can be based on the mathematical formulas given below.

For block boundaries in Category 1, a general linear function that can be used to determine threshold values can be formulated as follows:

$$\text{Threshold} = a + b \cdot (QP1 + QP2) + c \cdot |QP1 - QP2| + d \cdot UDO \quad (9)$$

Specifically, the thresholds used in Category 1 are determined as shown in the following formulas:

$$TH0\_INTRA = -2 + (QP1 + QP2) + 2 \cdot UDO \quad (10)$$

$$TH1\_INTRA = -1 + \frac{1}{2} \cdot (QP1 + QP2) + \frac{1}{2} \cdot |QP1 - QP2| + UDO$$

$$TH2\_INTRA = -2 + (QP1 + QP2) + |QP1 - QP2| + 2 \cdot UDO$$

For block boundaries in Category 2, a general linear function that can be used to determine threshold values can be formulated as follows:

$$\text{Threshold} = a + b \cdot (QP1+QP2) + c \cdot |QP1-QP2| + d \cdot MVI + e \cdot BFlag + f \cdot UDO \quad (11)$$

In formula (11), the MVI parameter represents the motion vector indicator, which is a function of the picture size as previously described, and BFlag parameter represents whether the picture is B-picture or not. If the picture is B-picture, BFlag is set to 1; otherwise, BFlag is set to 0. Specifically, the thresholds used in Category 2 are determined as shown in the following formulas:

$$TH0\_INTER = -2 + (QP1 + QP2) - 2 \cdot MVI - 2 \cdot BFlag + 2 \cdot UDO \quad (12)$$

$$TH1\_INTER = a + \frac{1}{2} \cdot (QP1 + QP2) +$$

$$\frac{1}{2} \cdot |QP1 - QP2| + 2 \cdot MVI - 2 \cdot BFlag + UDO$$

$$TH2\_INTER = a + (QP1 + QP2) + \frac{1}{2} \cdot |QP1 - QP2| -$$

$$2 \cdot MVI - 2 \cdot BFlag + 2 \cdot UDO$$

In the formulas (12), when the 8×8 block boundary is also a MB boundary, a is set to 1; otherwise, a is set to 3.

As shown above, there are common drawbacks in the adaptive de-blocking methods of the prior art. One problem associated with the prior art adaptive de-blocking methods is that they do not consider changes in the quantization parameter (QP) between adjacent macroblocks (MBs). The QP values of MBs may vary inside a frame when the video is encoded with an encoder optimization technique, such as MB-based rate control algorithms. In this case, adjacent 8×8 blocks can be quantized with different QP values when these 8×8 blocks belong to different MBs. Since blocking artifacts between two blocks encoded with different QPs tend to be more visible in general, the strength of the de-blocking filter according to the present invention is dynamically adapted to account for the QP value change. The threshold values used for the filtering decisions are also dynamically adapted to the QP value change.

Another common problem with prior adaptive de-blocking methods is that they do not consider blocking artifacts caused by motion compensated prediction. For inter-coded frames, since the blocking artifacts in the reference frames may propagate to the current frames and result in an inner-block blocking artifact, more pixels around the block boundary between two inter-coded blocks are examined and filtered according to the present invention. Additionally, in most of the prior art, the threshold values used for adjusting the filtering strength are determined without consideration of various coding parameters. For example, since blocking artifacts in inter-coded frames tend to be less visible because of the smoothing effect caused by adding the residual error signal and the reference signal, thresholds determined according to the present invention depend on the block coding type. In the prior art, only the in-loop de-blocking method proposed by List et al. (reference [9]) decides Bs parameter based on the 4×4 block-coding mode and uses different threshold values according to Bs parameter, however, it does not fully exploit the block-coding information.

Those skilled in the art will readily observe that numerous modifications and alterations of the device may be made while retaining the teachings of the invention. For example, other low pass filters having different numbers of taps or different filtering coefficients could also be used according to the present invention. Accordingly, the above disclosure should be construed as limited only by the metes and bounds of the appended claims.

What is claimed is:

1. A method for reducing a blocking artifact in a video stream, the method comprising:
    determining a filtering range according to block coding types of a plurality of adjacent blocks in the video stream, wherein the filtering range specifies a number of pixels to filter around a block boundary between the adjacent blocks; and
    filtering a plurality of pixels around the block boundary according to the filtering range to reduce the blocking artifact in the video stream;
    wherein determining the filtering range according to the block coding types of the adjacent blocks in the video stream further comprises:
        if at least one of the adjacent blocks is an intra-coded block, determining the filtering range to be up to four pixels around the block boundary; and
        if none of the adjacent blocks are intra-coded blocks, determining the filtering range to be up to eight pixels around the block boundary;
    if at least one of the adjacent blocks is an intra-coded block:
        if an activity value is greater than a first threshold, determining a region mode to be an active region;
        if the activity value is less than the first threshold but greater than a second threshold, determining the region mode to be a smooth region; and
        if the activity value is less than the second threshold, determining the region mode to be a dormant region; and
    if none of the adjacent blocks are intra-coded blocks:
        if the activity value is greater than a third threshold, determining the region mode to be an active region;
        if the activity value is less than the third threshold but greater than the second threshold, determining the region mode to be a smooth region; and
        if the activity value is less than the second threshold, determining the region mode to be a dormant region.

2. The method of claim 1, wherein the second threshold is fixed at a predetermined value.

3. The method of claim 2, wherein the predetermined value is 6.

4. The method of claim 1, further comprising:
    if at least one of the adjacent blocks is an intra-coded block:
        if the region mode is active region,
            if a high frequency component $c_3$ is less than a fourth threshold, filtering the pixels around the block boundary according to the filtering range using a first filter;
        if the region mode is smooth region,
            if the absolute value of the difference of the pixel values on either side of the block boundary is less than a fifth threshold, filtering the pixels around the block boundary according to the filtering range using a second filter; and
        if the region mode is dormant region,
            if the absolute value of the difference of the pixel values on either side of the block boundary is less than the fifth threshold, filtering the pixels around the block boundary according to the filtering range using a third filter; and
    if none of the adjacent blocks are intra-coded blocks:
        if the region mode is active region,
            if the high frequency component $c_3$ is less than a sixth threshold, filtering the pixels around the block boundary according to the filtering range using the first filter;
        if the region mode is smooth region,
            if the absolute value of the difference of the pixel values on either side of the block boundary is less than a seventh threshold, filtering the pixels around the block boundary according to the filtering range using the second filter; and
        if the region mode is dormant region,
            if the absolute value of the difference of the pixel values on either side of the block boundary is less than a seventh threshold, filtering the pixels around the block boundary according to the filtering range using the third filter.

5. The method of claim 4, further comprising adaptively determining the first, third, fourth, fifth, sixth, and seventh thresholds by at least taking into account differences in quantization parameters QPs of the adjacent blocks.

6. The method of claim 5, further taking into account a user defined offset (UDO) allowing the first, third, fourth, and fifth threshold levels to be adjusted according to the UDO value.

7. The method of claim 4, wherein the high frequency component $c_3$ is calculated using pixels $v_6$, $v_7$, $v_8$, $v_9$ around the block boundary as follows:

$$c_3 = (v_6 - v_7 + v_8 - v_9)/2.$$

8. The method of claim 4, wherein the first filter is a one dimensional filter formed by using a 4-point Hadamard Transform (HT), wherein the high frequency coefficient of the HT is reduced to 0 for frame-coded pictures.

9. The method of claim 4, wherein the first filter is a one dimensional filter formed by using a 4-point Hadamard Transform (HT), wherein the high frequency coefficient of the HT is reduced to one half for field-coded pictures.

10. The method of claim 4, wherein the filtered pixels are further refined by adjusting a pixel quantized with a larger QP to have more change in value than a pixel quantized with a smaller QP.

11. The method of claim 10, wherein a first weighting value WT1 and a second weighting value WT2 are used for adjusting the filtered pixels and are obtained from a first quantization parameter QP1 of a first adjacent block and a second quantization parameter QP2 of a second adjacent block as follows:

$$WT1=QP1/QP1+QP2,\ WT2=QP2/QP1+QP2.$$

12. The method of claim 4, wherein if quantization parameters (QPs) of the adjacent blocks are the same, symmetric second and third filters are used to filter the pixels around the block boundary for smooth and dormant region modes, respectively; and
if the QPs of the adjacent blocks are not the same, asymmetric second and third filters are used to filter the pixels around the block boundary for smooth and dormant region modes, respectively.

13. The method of claim 12, further comprising:
when the region mode is smooth region and the QPs of the adjacent blocks are the same, filtering the pixels around the block boundary with an N-tap symmetric second filter;
when the region mode is smooth region and the QPs of the adjacent blocks are not the same, filtering the pixels around the block boundary with an M-tap asymmetric second filter;
when the region mode is dormant region and the QPs of the adjacent blocks are the same, filtering the pixels around the block boundary with a K-tap symmetric third filter; and
when the region mode is dormant region and the QPs of the adjacent blocks are not the same, filtering the pixels around the block boundary with an L-tap asymmetric third filter.

14. The method of claim 13, wherein:
N=5 and the symmetric second filter is [1 3 8 3 1]/16;
M=5 and the asymmetric second filter is [1 2 8 3 2]/16 and [2 3 8 2 1]/16;
K=5 and the symmetric third filter is [1 2 2 2 1]/8; and
L=5 and the asymmetric third filter is [1 1 2 2 2]/8 and [2 2 2 1 1]/8.

15. A post processing de-blocking filter comprising:
a threshold determination unit for adaptively determining a plurality of threshold values according to at least differences in quantization parameters OPs of a plurality of adjacent blocks in a received video stream and according to a user defined offset (UDO) allowing the threshold levels to be adjusted according to the UDO value;
an interpolation unit for performing an interpolation operation to estimate pixel values in an interlaced field if the video stream comprises interlaced video; and
a de-blocking filtering unit for determining a filtering range specifying a maximum number of pixels to filter around a block boundary between the adjacent blocks, for determining a region mode according to local activity around the block boundary, for selecting one of a plurality of at least three filters to filter pixels around the block boundary to reduce the blocking artifact, and for filtering a plurality of pixels around the block boundary according to the filtering range, the region mode, and the selected filter;
wherein the de-blocking filtering unit further refines the filtered pixels according to the quantization parameters OPs of the adjacent blocks, or uses symmetric filters or asymmetric filters to filter the pixels according to the quantization parameters OPs of the adjacent blocks;
the de-blocking filtering unit first filters the pixels at the block boundary and next filters pixels not adjacent to the pixels at the block boundary; and
at least one of the filters is a one dimensional filter formed by using a 4-point Hadamard Transform (HT);
the de-blocking filtering unit calculates an activity value representing local activity around the block boundary and determines the region mode according to the activity value;
the de-blocking filtering unit calculates the activity value as a sum of absolute differences between pixels V1 around the block boundary as follows:

$$\text{ACTIVITY} = \sum_{l=4}^{6} |v_l - v_{l+1}| + \sum_{l=8}^{10} |v_l - v_{l+1}|;$$

if at least one of the adjacent blocks is an intra-coded block:
if the activity value is greater than a first threshold, the de-blocking filtering unit determines the region mode to be an active region;
if the activity value is less than the first threshold but greater than a second threshold, the de-blocking filtering unit determines the region mode to be a smooth region; and
if the activity value is less than the second threshold, the de-blocking filtering unit determines the region mode to be a dormant region; and
if none of the adjacent blocks are intra-coded blocks:
if the activity value is greater than a third threshold, the de-blocking filtering unit determines the region mode to be an active region;
if the activity value is less than the third threshold but greater than the second threshold, the de-blocking filtering unit determines the region mode to be a smooth region; and
if the activity value is less than the second threshold, the de-blocking filtering unit determines the region mode to be a dormant region.

16. The post processing de-blocking filter of claim 15, wherein the second threshold is fixed at a predetermined value.

17. The post processing de-blocking filter of claim 16, wherein the predetermined value is 6.

18. The post processing de-blocking filter of claim 15, wherein
if at least one of the adjacent blocks is an intra-coded block:
if the region mode is active region,
if a high frequency component ($c_3$) is less than a fourth threshold, the de-blocking filtering unit filters the pixels around the block boundary using a first filter;
if the region mode is smooth region,
if the absolute value of the difference of the pixel values on either side of the block boundary is less than a fifth threshold, if the QPs of the adjacent blocks are the same, the de-blocking filtering unit filters the pixels around the block boundary using a symmetric second filter; otherwise the de-blocking filtering unit filters the pixels around the block boundary using an asymmetric second filter; and if the region mode is dormant region,
if the absolute value of the difference of the pixel values on either side of the block boundary is less than the fifth threshold,
if the QPs of the adjacent blocks are the same, the de-blocking filtering unit filters the pixels around the block boundary using a
symmetric third filter; otherwise the de-blocking filtering unit filters the pixels around the block boundary using an asymmetric third filter; and if none of the adjacent blocks are intra-coded blocks:
if the region mode is active region, if the high frequency component ($c_3$) is less than a sixth threshold, the de-blocking filtering unit filters the pixels around the block boundary using the first filter;
if the region mode is smooth region,
if the absolute value of the difference of the pixel values on either side of the block boundary is less than a seventh threshold,
if the QPs of the adjacent blocks are the same, the de-blocking filtering unit filters the pixels around the block boundary using the symmetric second filter; otherwise the de-blocking filtering unit filters the pixels around the block boundary using the asymmetric second filter; and
if the region mode is dormant region,
if the absolute value of the difference of the pixel values on either side of the block boundary is less than the seventh threshold,
if the QPs of the adjacent blocks are the same, the de-blocking filtering unit filters the pixels around the block boundary using the symmetric third filter; otherwise the de-blocking filtering unit filters the pixels around the block boundary using the asymmetric third filter.

19. The post processing de-blocking filter of claim 18, wherein:

the symmetric second filter is an N-tap symmetric filter;
the asymmetric second filter is an M-tap asymmetric filter;
the symmetric third filter is a K-tap symmetric filter; and
the asymmetric third filter is an L-tap asymmetric filter.

20. The post processing de-blocking filter of claim 19, wherein:

the N-tap symmetric filter is [1 3 8 3 1]/16;
the M-tap asymmetric filter is [1 2 8 3 2]/16 and [2 3 8 2 1]/16;
the K-tap symmetric filter is [1 2 2 2 1]/8; and
the L-tap asymmetric filter is [1 1 2 2 2]/8 and [2 2 2 1 1]/8.

21. The post processing de-blocking filter of claim 18, wherein the high frequency component ($c_3$) is calculated using pixels $v_6$, $v_7$, $v_8$, $v_9$ around the block boundary as follows:

$$c_3 = (v_6 - v_7 + v_8 - v_9)/2.$$

22. The post processing de-blocking filter of claim 18, wherein the first filter is a one dimensional filter formed by using the 4-point Hadamard Transform (HT), wherein the high frequency coefficient of the HT is reduced to 0 for fame-coded pictures.

23. The post processing de-blocking filter of claim 18, wherein the first filter is a one dimensional filter formed by using a 4-point Hadamard Transform (HT), wherein the high frequency coefficient of the HT is reduced to one half for field-coded pictures.

24. The post processing de-blocking filter of claim 18, wherein the filtered pixels are further refined by adjusting a pixel quantized with a larger QP to have more change in value than a pixel quantized with a smaller QP.

25. The post processing de-blocking filter of claim 24, wherein the de-blocking filtering unit uses a first weighting value WT1 and a second weighting value WT2 for adjusting the filtered pixels, WT1 and WT2 being obtained from a first quantization parameter QP1 of a first adjacent block and a second quantization parameter QP2 of a second adjacent block as follows:

$$WT1 = {QP1}/{QP1+QP2},\ WT2 = {QP2}/{QP1+QP2}.$$

* * * * *